US012648017B2

(12) United States Patent
He

(10) Patent No.: US 12,648,017 B2
(45) Date of Patent: Jun. 2, 2026

(54) RANDOM ACCESS RESOURCE DETERMINING METHOD, ELECTRONIC DEVICE AND STORAGE MEDIUM

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 268 days.

(21) Appl. No.: 18/227,978

(22) Filed: Jul. 31, 2023

(65) Prior Publication Data

US 2023/0371062 A1     Nov. 16, 2023

Related U.S. Application Data

(63) Continuation of application No. PCT/CN2021/079168, filed on Mar. 4, 2021.

(51) Int. Cl.
*H04W 72/21*     (2023.01)
*H04L 1/1829*     (2023.01)
(Continued)

(52) U.S. Cl.
CPC ......... *H04W 74/006* (2013.01); *H04L 1/1861* (2013.01); *H04L 5/0005* (2013.01); *H04L 5/0092* (2013.01); *H04W 72/21* (2023.01)

(58) Field of Classification Search
CPC ............... H04W 74/006; H04W 72/21; H04W 74/0866; H04W 48/12; H04L 1/1861;
(Continued)

(56) References Cited

U.S. PATENT DOCUMENTS 9,042,319 B2     5/2015  Papasakellariou
9,357,532 B2     5/2016  Papasakellariou
(Continued)

FOREIGN PATENT DOCUMENTS

CN         106664188 A      5/2017
CN         108811123 A     11/2018
(Continued)

OTHER PUBLICATIONS

Supplementary European Search Report in the European application No. 21928540.0, mailed on Jan. 22, 2024, 10 pages.
(Continued)

*Primary Examiner* — Edan Orgad
*Assistant Examiner* — Malick A Sohrab
(74) *Attorney, Agent, or Firm* — BAYES PLLC

(57)           ABSTRACT

Provided is a method for determining resources for random access, a terminal device and a network device. A terminal device with reduced capability (RedCap) determined a second common Physical Uplink Control Channel (PUCCH) resource based on a frequency domain position of a first common PUCCH resource and a frequency offset, where the second common PUCCH resource is a resource, for sending Hybrid Automatic Repeat Request (HARQ) feedback information, within a bandwidth for the terminal device with RedCap, and the first common PUCCH resource is a resource, for sending HARQ feedback information, corresponding to an initial uplink bandwidth part (BWP).

14 Claims, 17 Drawing Sheets

A terminal device with RedCap determines a second common PUCCH resource based on a frequency domain position of a first common PUCCH resource and a frequency offset     S201

(51) Int. Cl.
　　*H04L 5/00*　　　　(2006.01)
　　*H04W 74/00*　　　(2009.01)

(58) Field of Classification Search
　　CPC ... H04L 5/0005; H04L 5/0092; H04L 1/1854;
　　　　　　　　　　H04L 5/0053; H04L 5/0055
　　See application file for complete search history.

(56) References Cited

U.S. PATENT DOCUMENTS

| | | | |
|---|---|---|---|
| 9,554,369 | B2 | 1/2017 | Papasakellariou |
| 9,800,387 | B2 | 10/2017 | Gang |
| 9,839,010 | B2 | 12/2017 | Papasakellariou |
| 10,554,365 | B2 | 2/2020 | Lee |
| 2013/0083751 | A1 | 4/2013 | Papasakellariou |
| 2015/0230229 | A1 | 8/2015 | Papasakellariou |
| 2016/0028524 | A1 | 1/2016 | Papasakellariou |
| 2016/0028525 | A1 | 1/2016 | Papasakellariou |
| 2016/0134403 | A1 | 5/2016 | Xiong |
| 2017/0295005 | A1 | 10/2017 | Lee |
| 2018/0367278 | A1* | 12/2018 | Chatterjee ............. H04L 1/1858 |
| 2019/0261356 | A1 | 8/2019 | Sechang |
| 2020/0084773 | A1 | 3/2020 | Li |
| 2020/0236672 | A1 | 7/2020 | Sechang |
| 2020/0244421 | A1* | 7/2020 | Lee ...................... H04L 27/0008 |
| 2020/0280985 | A1* | 9/2020 | Ijaz ....................... H04W 72/20 |
| 2020/0295913 | A1* | 9/2020 | Takeda .................... H04L 5/001 |
| 2023/0180199 | A1* | 6/2023 | Jung ...................... H04L 1/0038 |
| | | | 370/329 |
| 2023/0292322 | A1* | 9/2023 | Kim ...................... H04L 1/1864 |
| 2024/0049205 | A1* | 2/2024 | Fei .................... H04W 72/0453 |

FOREIGN PATENT DOCUMENTS

| | | | |
|---|---|---|---|
| EP | 3537818 | A1 | 9/2019 |
| WO | 2013048213 | A1 | 4/2013 |
| WO | 2016073122 | A1 | 5/2016 |

OTHER PUBLICATIONS

Ericsson: "Potential UE complexity reduction features for RedCap", 3GPP Draft; R1-2008837, 3rd Generation Partnership Project (3GPP), MoBILEcOmPETENCE CENTRE; 650, Route Des Lucioles ; F-06921 Sophia-Antipolis Cedex; France vol. Ran WG1, No. Online; Oct. 26, 2020-Nov. 13, 2020 Oct. 21, 2020 (Oct. 21, 2020), XP051940912, Section 4.5, 62 pages.

International Search Report in the international application No. PCT/CN2021/079168, mailed on Nov. 5, 2021. 5 pages with English translation.

Written Opinion of the International Search Authority in the international application No. PCT/CN2021/079168, mailed on Nov. 5, 2021. 8 pages with English translation.

"3rd Generation Partnership Project; Technical Specification Group Radio Access Network; NR; Multiplexing and channel coding (Release 16)", 3GPP TS 38.212 V16.2.0 (Jun. 2020). 146 pages.

"3rd Generation Partnership Project; Technical Specification Group Radio Access Network; NR; Physical layer procedures for control (Release 16)", 3GPP TS 38.213 V16.2.0 (Jun. 2020). 176 pages.

"3rd Generation Partnership Project; Technical Specification Group Radio Access Network; NR; Radio Resource Control (RRC) protocol specification (Release 16)", 3GPP TS 38.331 V16.1.0 (Jul. 2020). 902 pages.

First Office Action of the European application No. 21928540.0, issued on Oct. 24, 2024, 5 pages.

Supplementary European Search Report in the European application No. 25226225.8, mailed on Mar. 25, 2026.

* cited by examiner

100

110

120

120

Figure 3:
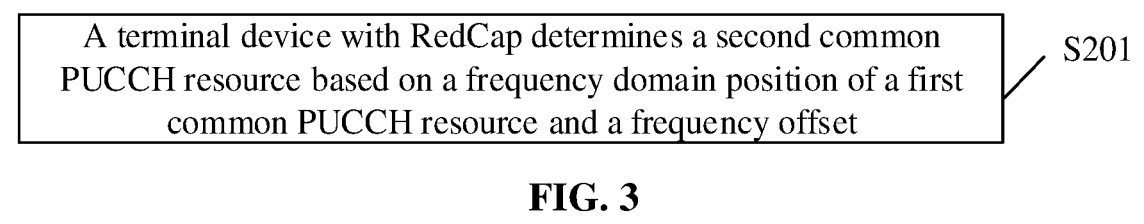

A terminal device with RedCap determines a second common
PUCCH resource based on a frequency domain position of a first
common PUCCH resource and a frequency offset

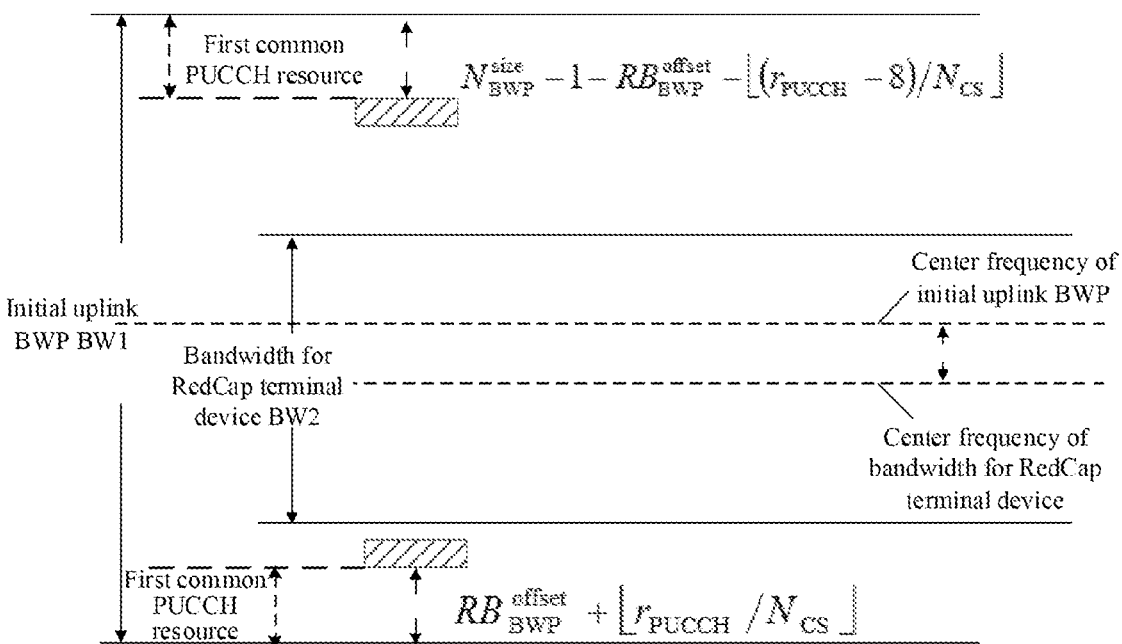

First common PUCCH resource $\quad N_{\text{BWP}}^{\text{size}} - 1 - RB_{\text{BWP}}^{\text{offset}} - \left\lfloor (r_{\text{PUCCH}} - 8)/N_{\text{CS}} \right\rfloor$ Center frequency of initial uplink BWP Initial uplink BWP BW1

Bandwidth for RedCap terminal device BW2

Center frequency of bandwidth for RedCap terminal device

First common PUCCH resource $\quad RB_{\text{BWP}}^{\text{offset}} + \left\lfloor r_{\text{PUCCH}}/N_{\text{CS}} \right\rfloor$

FIG. 4

Figure 9:
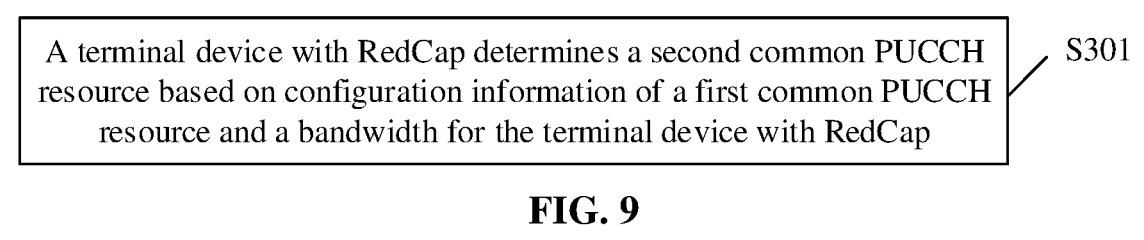

A terminal device with RedCap determines a second common PUCCH resource based on configuration information of a first common PUCCH resource and a bandwidth for the terminal device with RedCap

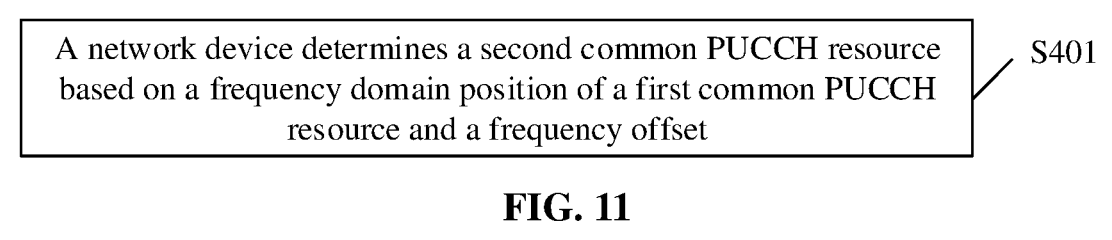

A network device determines a second common PUCCH resource based on a frequency domain position of a first common PUCCH resource and a frequency offset — S401

FIG. 11

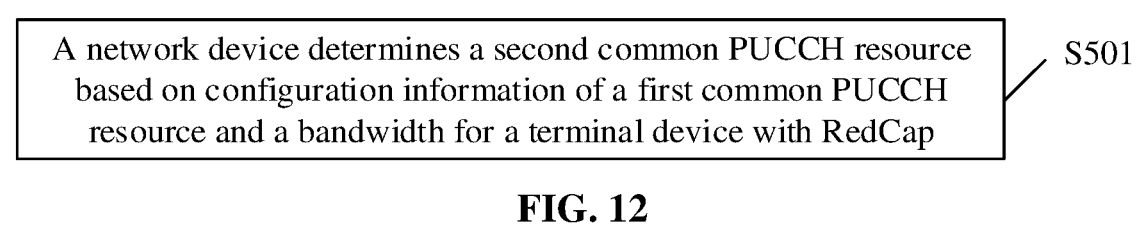

A network device determines a second common PUCCH resource based on configuration information of a first common PUCCH resource and a bandwidth for a terminal device with RedCap    S501

FIG. 12

Terminal device 800

Second processing unit 801

FIG. 14

Network device 1000

Fourth processing unit
1001

FIG. 16

RANDOM ACCESS RESOURCE DETERMINING METHOD, ELECTRONIC DEVICE AND STORAGE MEDIUM

CROSS-REFERENCE TO RELATED APPLICATION

This application is a continuation of International Patent Application No. PCT/CN2021/079168 filed on Mar. 4, 2021, the disclosure of which is incorporated by reference in its entirety.

BACKGROUND

In a New Radio (NR) system, a terminal device with Reduced Capability (RedCap) having characteristics of low complexity, low cost and low capability is introduced. Thus, How to allocate efficient resources for random access for the terminal device with RedCap is a goal that has been pursued all the time.

SUMMARY

The disclosure relates to the technical field of wireless communications, and in particular to, methods for determining resources for random access, an electronic device and a storage medium.

Embodiments of the disclosure provide methods for determining resources for random access, an electronic device and a storage medium, which can clearly define the opportunity when the terminal device receives a paging message.

In a first aspect, embodiments of the present disclosure provide a method for determining resources for random access, which includes the following operation. A terminal device with RedCap determines a second common Physical Uplink Control Channel (PUCCH) resource based on a frequency domain position of a first common PUCCH resource and a frequency offset. The second common PUCCH resource is a resource, for sending Hybrid Automatic Repeat Request (HARQ) feedback information, within a bandwidth for the terminal device with RedCap, and the first common PUCCH resource is a resource, for sending HARQ feedback information, corresponding to an initial uplink Bandwidth Part (BWP).

In a second aspect, embodiments of the present disclosure provide a method for determining resources for random access, which includes the following operation. A terminal device with RedCap determines a second common PUCCH resource based on configuration information of a first common PUCCH resource and a bandwidth for the terminal device with RedCap. The second common PUCCH resource is a resource, for sending HARQ feedback information, within the bandwidth for the terminal device with RedCap, and the first common PUCCH resource is a resource, for sending HARQ feedback information, corresponding to an initial uplink BWP.

In a third aspect, embodiments of the present disclosure provide a terminal device including a processor and a memory configured to store computer programs capable of running on the processor. The processor is configured to implement, when running the computer programs, the operations of the method for determining resources for random access performed by the terminal device as described above.

In a fourth aspect, embodiments of the present disclosure provide a network device including a processor and a memory configured to store computer programs capable of running on the processor. The processor is configured to implement, when running the computer programs, the operations of the method for determining resources for random access performed by the network device as described above.

BRIEF DESCRIPTION OF THE DRAWINGS

FIG. 3 is a schematic diagram of an optional processing flow of a method for determining resources for random access according to an embodiment of the present disclosure.

FIG. 4 is a schematic diagram of a relationship between an initial UL BWP and a bandwidth for a terminal device with RedCap according to an embodiment of the present disclosure.

FIG. 9 is a schematic diagram of another optional process flow of a method for determining resources for random access according to an embodiment of the present disclosure.

FIG. 11 is a schematic diagram of an optional process flow of a method for determining resources for random access according to an embodiment of the present disclosure.

FIG. 12 is a schematic diagram of another optional process flow of a method for determining resources for random access according to an embodiment of the present disclosure.

FIG. 14 is a schematic diagram of another optional composition structure of a terminal device according to an embodiment of the present disclosure.

FIG. 16 is a schematic diagram of another optional composition structure of a network device according to an embodiment of the present disclosure.

DETAILED DESCRIPTION

Figure 1:
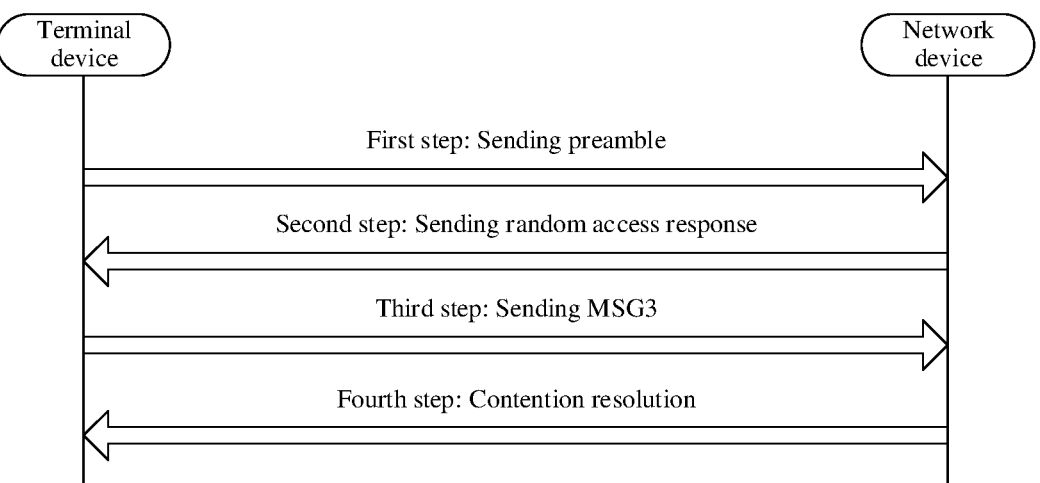
FIG. 1 is a schematic diagram of a random access procedure according to an embodiment of the present disclosure.

In order to enable a more detailed understanding of the features and technical content of the embodiments of the present disclosure, the implementation of the embodiments of the present disclosure will be described in detail below in conjunction with the accompanying drawings, which are provided for illustration only and are not intended to limit the embodiments of the present disclosure.

Before describing the embodiments of the present disclosure, the related contents will be briefly explained.

NR system can support Enhanced Mobile Broadband (eMBB) service to satisfy the needs of high speed, high spectrum efficiency and large bandwidth. In practical applications, besides the eMBB service, there are many different types of services, such as sensor network service, video surveillance service and wearable service. These types of services have different requirements from the eMBB service in terms of speed, bandwidth, power consumption and cost. Compared to terminal devices supporting eMBB, terminal devices supporting these services have reduced capability, such as reduced supported bandwidth, relaxed processing time and reduced number of antennas. Therefore, it is necessary to optimize the NR system for these services and the corresponding terminal devices with RedCap, and the optimized system is called NR-light system. In LTE technology, similar systems have been designed to support terminals with large number of connections, low power consumption and low cost, such as Machine Type Communication (MTC) and Narrow Band Internet of Thing (NB-IoT). In the NR system, it is desirable to introduce similar technologies to use NR technology to better support other types of services except the eMBB service. A terminal device supporting this kind of service has the characteristics of low complexity, low cost and low capability, which is called terminal device with RedCap or RedCap terminal device.

Compared with the traditional NR terminal device, the terminal device with RedCap has the characteristics of low complexity and low cost, such as reduced receiving channels, reduced supported transmission bandwidth and so on. At present, NR terminal device needs to support at least two receiving channels, and NR terminal device in some frequency bands needs to support four receiving channels. Each receiving channel includes a receiving antenna, a filter, a power amplifier, an analog-to-digital sampler and other components. Therefore, reducing the number of RF channels required by NR terminal device will significantly reduce the cost of the terminal. In addition, traditional NR terminal device needs to support a wider transmission bandwidth. For example, for the frequency range FR1, NR terminal device needs to support a maximum bandwidth of 100 MHz, and for the frequency range FR2, NR terminal device needs to support a maximum bandwidth of 400 MHz. In order to reduce the cost of the terminal device with RedCap and reduce the power consumption of the terminal device with RedCap, the terminal device with RedCap can support a smaller transmission bandwidth, only a transmission bandwidth of 20 MHz is supported for the frequency range FR1 and only a transmission bandwidth of 100 MHz is supported for the frequency range FR2.

In addition, the terminal device with RedCap may also have the characteristics of supporting lower peak rate, supporting looser processing latency, and larger processing latency.

For a terminal device in the initial access stage, after receiving system information sent from the network device, the terminal device initiates a random access procedure and establishes a Radio Resource Control (RRC) connection with the network device. In the process of establishing the RRC connection, the terminal device needs to identify the type of the terminal device as the ordinary terminal device (terminal device without RedCap or non-RedCap terminal device) or terminal device with RedCap (RedCap terminal device), and acquire the capability information related to the terminal device. Specifically, the terminal device may indicate the type of the terminal device in any one of the following manners: 1) the type of the terminal device is indicated in the stage of sending Msg1, for example, the type of the terminal device is indicated through the initial UpLink (UL) Bandwidth Part (BWP) where Msg 1 is transmitted, through independent resources for Random Access Channel (RACH), or partitioning independent sets of random access preambles; 2) the type of the terminal device is indicated in the stage of sending Msg3, for example, the type of the terminal device is indicated in the payload of the Physical Uplink Shared Channel (PUSCH) carrying Msg 3; 3) the type of the terminal device is indicated after transmission of Msg4, such as the type of the terminal device is indicated by Msg5 or the type of the terminal device is reported as the capability of the terminal device; and 4) the type of the terminal device is indicated in the stage of sending MsgA in a 2-step random access.

The random access process is briefly described below. The schematic diagram of random access procedure in NR system, as shown in FIG. 1, adopts a four-step random access mode, including the following four steps.

In a first step, the terminal device sends a random access including a preamble(s) to the network device, i.e. the terminal device sends a message 1 (MSG1).

In a second step, after the network device detects the preamble(s), the network device sends a Random Access Response (RAR) to the terminal device. That is, the network device sends MSG2. MSG2 carries PUSCH resources that can be used for sending MSG3 by the terminal device, a Radio Network Temporary Identity (RNTI) allocated for the terminal device, and a time advance command allocated for the terminal device.

In a third step, the terminal device sends the MSG3 by using the PUSCH resources indicated by the RAR message, and the MSG3 carries the temporary identity information specific to the terminal device.

In a fourth step, the network device sends the MSG4 to the terminal device. The MSG4 includes a contention resolution message. The network device allocates uplink transmission resources for the terminal device. After receiving the MSG4 sent from the network device, the terminal device will detect whether the temporary identity information specific to the terminal device sent by the terminal device in the MSG3 is included in the contention resolution message from the base station. If it is included, it indicates that the random access of the terminal device is successful, or otherwise it is considered that the random access of the terminal device fails, and the terminal device needs to initiate the random access procedure starting from the first step again.

In the initial access stage of terminal device, for example in the random access procedure, it is necessary to send Hybrid Automatic Repeat Request (HARQ) feedback information for Msg4 or MsgB through a Physical Uplink Control Channel (PUCCH). Since there is no configuration of the PUCCH resource set dedicated to the terminal device at this time, a predefined manner is adopted. The predefined PUCCH resource set is only used for sending the HARQ feedback information, so each of the PUCCH resources in the predefined PUCCH resource set only needs to carry 1-2 bit HARQ feedback information, that is, each of the PUCCH resources is only composed of PUCCH format 0 and PUCCH format 1. The network device configures, through the System Information Block (SIB1), a common PUCCH resource set for all the terminal devices before the RRC is established.

The terminal device transmits the HARQ-ACK information at the initial UL BWP by using a PUCCH resource that is configured through pucch-ResourceCommon in PUCCH-ConfigCommon. The relevant signaling is as follows.

PUCCH-ConfigCommon Information Element

---

```
-- ASN1START
-- TAG-PUCCH-CONFIGCOMMON-START
PUCCH-ConfigCommon :: = SEQUENCE {
pucch-ResourceCommon INTEGER (0..15) OPTIONAL, -- Cond
InitialBWP-Only
pucch-GroupHopping ENUMERATED { neither, enable, disable },
hoppingID INTEGER (0..1023) OPTIONAL, -- Need R
p0-nominal INTEGER (−202..24) OPTIONAL, -- Need R
...
}
```

---

The pucch-ResourceCommon indicates an index of one of the rows in Table 1, each row in Table 1 represents a common PUCCH resource set. The corresponding PUCCH format, starting number of symbols, number of PUCCH Symbols, frequency domain position and PUCCH cyclic shift set can be determined from Table 1.

TABLE 1

| | | | | | |
|---|---|---|---|---|---|
| | PUCCH resource sets before PUCCH resource configuration | | | | |
| Index | PUCCH format | First symbol | Number of symbols | PRB offset $RB_{BWP}^{offset}$ | Set of initial CS indexes |
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The pucch-ResourceCommon resource is used, and frequency hopping mode is used in a fixed manner. The parameters of PUCCH format 0 and PUCCH format 1 can be acquired from the Table 1 above. The frequency domain position and PUCCH cyclic shift in the last column are calculated as follows.

For the PUCCH resource, an index of a resource for sending the HARQ-ACK information through PUCCH is $\gamma_{PUCCH}$, and $0 \leq \gamma_{PUCCH} \leq 15$, $$\gamma_{PUCCH} = \left\lfloor \frac{2n_{CCE,0}}{N_{CCE}} \right\rfloor + 2\Delta_{PRI},$$

where $N_{CCE}$ is the number of control channel elements (CCE) in a Control resource set (CORESET) of the PDCCH, $n_{CCE,0}$ is an index of the first CCE of the received PDCCH in CORESET. $\Delta_{PRI}$ is a value that is indicated by the PUCCH resource indicator domain in Downlink Control Information (DCI) with format 1_0 or format 1_1.

The PRB index and the initial cyclic shift index are determined as follows.

If $\lfloor \gamma_{PUCCH}/8 \rfloor = 0$, a PRB index of a first hopping for PUCCH transmission is $$RB_{BWP}^{offset} + \lfloor \gamma_{PUCCH}/N_{CS} \rfloor,$$

and a PRB index of a second hopping is $$N_{BWP}^{size} - 1 - RB_{BWP}^{offset} - \lfloor \gamma_{PUCCH}/N_{CS} \rfloor,$$

where $N_{CS}$ represents the number of indexes in a set of initial cyclic shift (CS) indexes, and an index of the initial cyclic shift is $\gamma_{PUCCH} \mod N_{CS}$.

If $\lfloor \gamma_{PUCCH}/8 \rfloor = 1$, the PRB index of the first hopping for the PUCCH transmission is $$N_{BWP}^{size} - 1 - RB_{BWP}^{offset} - \lfloor (\gamma_{PUCCH} - 8)/N_{CS} \rfloor,$$

and the PRB index of the second hopping is $$RB_{BWP}^{offset} + \lfloor (\gamma_{PUCCH} - 8)/N_{CS} \rfloor,$$

where $N_{CS}$ represents the number of indexes in a set of initial cyclic shift (CS) indexes, and an index of the initial cyclic shift is $(\gamma_{PUCCH} - 8) \mod N_{CS}$.

In the related art, during the initial access procedure, a terminal device needs to acquire CORESET #0 and search space #0 information for PDCCH with type 0 from Master Information Block (MIB) information carried by Physical Broadcast Channel (PBCH), and the CORESET #0 and search space #0 are used for indicating RBs in frequency domain and symbols in time domain for the PDCCH with type 0. The CORESET #0 information indicates one of the indexes in the above table, the number of RBs and the number of symbols for CORESET #0 can be obtained according to the index, and the RB offset compared with the SSB is obtained. For the frequency range FR1, in a case where the subcarrier spacing is 15 kHz, the bandwidths of CORESET #0 can be configured to be 24 RBs, 48 RBs, 96 RBs, which correspond to the bandwidths of 5 MHz, 10 MHz, 20 MHz, respectively. In a case where the subcarrier spacing is 30 kHz, a maximum number of RBs configured for CORESET #0 is 48, and therefore the bandwidth of CORESET #0 will not exceed 20 MHz. The terminal device receives scheduling information for Physical Downlink Shared Channel (PDSCH) carrying SIB through type0 PDCCH, thereby receiving SIB1 information. For the frequency range FR1, the terminal device with RedCap can support a bandwidth of 20 MHz in the initial access stage, which is greater than or equal to the bandwidth of CORESET #0, so PDCCH with the type 0 can be received successfully. Similarly, for the frequency range FR2, the terminal device with RedCap can support a bandwidth of 100 MHz in the initial access stage, which is also greater than or equal to the bandwidth of CORESET #0.

The terminal device can receive scheduling information of PDSCH carrying SIB1 through type0 PDCCH, thereby receiving SIB1 information. The terminal device can obtain configuration information of an initial DL BWP and an initial UL BWP from the SIB1 information. In the random access procedure of the terminal device, sending and receiving of channels may be performed on the initial DL BWP and the initial UL BWP. In the prior art, a bandwidth configured for the initial UL BWP is allowed to exceed the bandwidth of CORESET #0. If a cell supports the access of the terminal device with RedCap and follows the existing configuration of the initial UL BWP, the bandwidth configuration of the cell may exceed the bandwidth capability of the terminal device with RedCap, resulting in the terminal device with RedCap being unable to correctly receive and send the channels in the initial access stage.

A common PUCCH resource configured by the network device exists within the configured initial UL BWP. Since the bandwidth of the terminal device with RedCap may be smaller than the bandwidth of the initial UL BWP, the bandwidth supported by the terminal device with RedCap may not include the resources of the existing configured uplink channel, such as the common PUCCH resource, resulting in the terminal device with RedCap being unable to use the common PUCCH resource configured by the network in the initial access stage.

The technical proposal of the embodiments of the present disclosure can be applied to various communication systems, such as: global system of mobile communication (GSM) system, code division multiple access (CDMA) system, wideband code division multiple access (WCDMA) system, general packet radio service (GPRS), LTE system, LTE frequency division duplex (FDD) system, LTE time division duplex (TDD) system and advanced long-term evolution (LTE-A) system, NR system, evolution system of NR system, LTE-based access to unlicensed spectrum (LTE-U) system, NR-based access to unlicensed spectrum (NR-U) system, universal mobile telecommunications system (UMTS), worldwide interoperability for microwave access (WiMAX) communication system, wireless local area networks (WLAN), wireless fidelity (WiFi), next generation communication system or other communication systems, etc.

The system architecture and service scenario described in the embodiments of the disclosure are intended to more clearly explain the technical proposal of the embodiments of the disclosure, and do not constitute a limitation to the technical proposal provided by the embodiments of the disclosure. Those skilled in the art will know that the technical proposal provided by the embodiments of the disclosure is equally applicable to similar technical problems with the evolution of the network architecture and the emergence of new service scenarios.

The network device in the embodiments of the present disclosure may be a common base station (such as NodeB or eNB or gNB), a new radio controller (NR controller), a centralized unit, a new radio base station, a radio remote module, a micro base station, a relay, a distributed unit, a transmission reception point (TRP), a transmission point (TP) or any other device. The embodiments of the present disclosure are not limited to the specific technology and the specific device form adopted by the network device. For convenience of description, in all embodiments of the present disclosure, the above-mentioned device configured to provide a wireless communication function for the terminal device is collectively called as the network device.

In embodiments of the present disclosure, the terminal device may be any terminal, for example, the terminal device may be UE for MTC. That is to say, the terminal device may also be called as UE, a mobile station (MS), a mobile terminal, a terminal, etc. The terminal device may communicate with one or more core networks via a radio access network (RAN). For example, the terminal device may be a mobile telephone (which is also called as "cellular" telephone), a computer with a mobile terminal, etc. For example, the terminal device may also be a portable device, pocket-sized device, hand-held device, computer-built device or vehicle-mounted mobile device that are can exchange language and/or data with the radio access network, which is not specifically limited in the embodiments of the present disclosure.

Optionally, network device and terminal device can be deployed on land including indoor or outdoor, and deployed as hand-held or vehicle-mounted; on the water surface; on airplanes, balloons and artificial satellites in the air. Embodiments of the present disclosure are not limited to applied scenarios of the network device and the terminal device.

Optionally, a communication between the network device and the terminal device and a communication between the terminal device and the terminal device may be performed through the licensed spectrum, the unlicensed spectrum, or both the licensed spectrum and the unlicensed spectrum. The communication between network device and terminal device and the communication between the terminal device and the terminal device may be performed by using frequency spectrum below 7 gigahertz (GHz) or above 7 GHz, and can also be performed by using frequency spectrum below 7 GHz and above 7 GHz simultaneously. Embodiments of the present disclosure are not limited to the spectrum resources used between the network device and the terminal device.

In general, conventional communication systems support a limited number of connections and the connections are easy to implement. However, with the development of communication technology, mobile communication systems will not only support conventional communication, but also support, for example, device to device (D2D) communication, machine to machine (M2M) communication, MTC, vehicle to vehicle (V2V) communication, etc. Embodiments of the present disclosure can also be applied to these communication systems.

Figure 2:
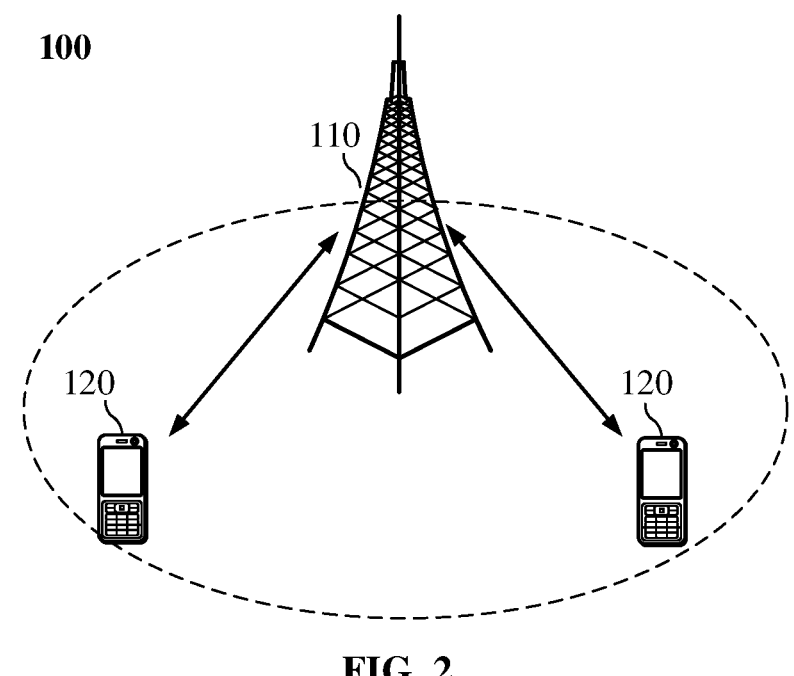
FIG. 2 is a schematic diagram of a composition structure of a communication system according to an embodiment of the present disclosure.

Exemplarily, FIG. 2 illustrates a communication system 100 to which embodiments of the present disclosure are applied. The communication system 100 may include a network device 110, which may be a device communicating with a terminal device 120 (also called as a communication terminal, terminal). The network device 110 may provide communication coverage for a specific geographic area and may communicate with a terminal located within the coverage area. Optionally, the network device 110 can be a Base Transceiver Station (BTS) in a GSM system or a CDMA system, a base station (NodeB, NB) in a WCDMA system, or an Evolutional base station (Evolutional Node B, eNB or eNodeB) or a wireless controller in network in a cloud radio access network (CRAN) in an LTE system, or the network device can be mobile switching center, relay station, access point, on-board equipment, wearable equipment, hub, switch, bridge, router, network-side device in 5G network or network device in a future communication system, etc.

The communication system 100 also includes at least one terminal 120 located within the coverage of the network device 110. The "terminal" used herein includes but is not limited to the connection via wired lines, such as public switched telephone networks (PSTN) and digital subscriber lines Line (DSL), digital cable, direct cable connection; and/or another data connection/network; and/or via wireless interface, such as for cellular network, wireless local area network (WLAN), such as DVB-H Digital television network, satellite network, AM-FM broadcast transmitter of the network; and/or device set to receive/send communication signals of another terminal; and/or Internet of things (JOT) device. A terminal set to communicate via a wireless interface may be referred to as a "wireless communication terminal", "wireless terminal" or "mobile terminal". Examples of mobile terminals include, but are not limited to, satellites or cellular phones; personal communications systems that can combine cellular radio telephony with data processing, fax, and Personal Communication System (PCS) terminals; PDAs that may include radiophones, pagers, Internet/intranet access, web browsers, notebooks, calendars, and/or global positioning system (GPS) receivers; and conventional laptop and/or handheld receivers or other electronic devices including radiophone transceivers. The terminal can refer to access terminal, UE, user unit, user station, mobile station, mobile station, remote station, remote terminal, mobile device, user terminal, terminal, wireless communication device, user agent or user device. Access terminals can be cellular telephone, cordless telephone, session initiation protocol (SIP) telephone, wireless local loop (WLL) station, personal digital processing Assistant, (PDA), handheld device with wireless communication function, computing device or other processing device connected to wireless modem, on-board device, wearable device, terminal device in 5G network or terminal device in PLMN evolving in the future.

Optionally, the terminal devices 120 may perform Device to Device (D2D) communication.

Optionally, the 5G system or 5G network may also be called as the NR system or NR network.

FIG. 2 exemplarily illustrates one network device and two terminal devices. Optionally, the communication system 100 may include multiple network devices and other numbers of terminal devices may be included within the coverage of each network device, which is not limited by embodiments of the present disclosure.

Optionally, the communication system 100 may also include other network entities such as network controllers, mobility management entities and the like, which are not limited by embodiments of the present disclosure.

It should be understood that a device having a communication function in a network/system in the embodiments of the present disclosure may be called as a communication device. Taking the communication system 100 shown in FIG. 2 as an example, the communication device may include a network device 110 and terminal devices 120 that both have a communication function and the network device 110 and the terminal devices 120 may be specific devices described above and will not be described herein. The communication device may also include other devices in the communication system 100, such as network controllers, mobility management entities and other network entities, which are not limited in embodiments of the present disclosure.

FIG. 3 illustrates an optional processing flow of the method for determining resources for random access according to an embodiment of the present disclosure. The method for determining resources for random access may include operation S201.

In operation S201, a terminal device with RedCap determines a second common PUCCH resource based on a frequency domain position of a first common PUCCH resource and a frequency offset.

In some embodiments, the second common PUCCH resource is a resource, for sending Hybrid Automatic Repeat Request (HARQ) feedback information, within a bandwidth corresponding to the terminal device with RedCap, and the first common PUCCH resource is a resource, for sending HARQ feedback information, corresponding to an initial uplink (UL) Bandwidth Part (BWP). The first common PUCCH resource is configured to by the network device.

In some embodiments, the frequency offset includes a first frequency offset and a second frequency offset.

In some embodiments, the frequency offset may be configured by a network device, or may also be determined according to a predefined rule. If the frequency offset is configured by the network device, the terminal device with RedCap can determine the frequency offset by receiving system information or an RRC signaling sent from the network device, i.e. the system information or the RRC signaling carries the frequency offset. For example, the network device indicates the frequency offset to the terminal device through the PUCCH-ConfigCommon or pucch-ResourceCommon information. If the frequency offset is configured by the network device, the network device can also determine the frequency offset according to a predefined rule, and then send the determined frequency offset to the terminal device with RedCap through system information or RRC signaling. If the network device does not send the frequency offset to the terminal device with RedCap through the system information or RRC signaling, the terminal device with RedCap may also determine the frequency offset according to a predefined rule.

In some embodiments, the predefined rule may include that: the frequency offset is determined based on a relationship between the initial uplink BWP and the bandwidth corresponding to the terminal device with RedCap. If the first frequency offset included in the frequency offset is represented as RBooffset1 and the second frequency offset included in the frequency offset is represented as RBooffset2, a schematic diagram of a relationship between the initial UL BWP and the bandwidth corresponding to the terminal device with RedCap is shown in FIG. 4. In FIG. 4, the initial UL BWP is represented as BW1, the bandwidth corresponding to the terminal device with RedCap is represented as BW2, and a difference between a center frequency of BW1 and a center frequency of BW2 is represented as CFoffset, then RBoffset1=(BW1−BW2)/2−CFoffset, and RBoffset2=(BW1−BW2)/2+CFoffset. That is to say, the first frequency offset is equal to a difference between half of a difference between the initial uplink BWP and the bandwidth for the terminal device with RedCap and a difference between a center frequency of the initial uplink BWP and a center frequency of the bandwidth for the terminal device with RedCap; and the second frequency offset is equal to a sum of half of the difference between the initial uplink BWP and the bandwidth for the terminal device with RedCap and the difference between the center frequency of the initial uplink BWP and the center frequency of the bandwidth for the terminal device with RedCap.

Figure 5:
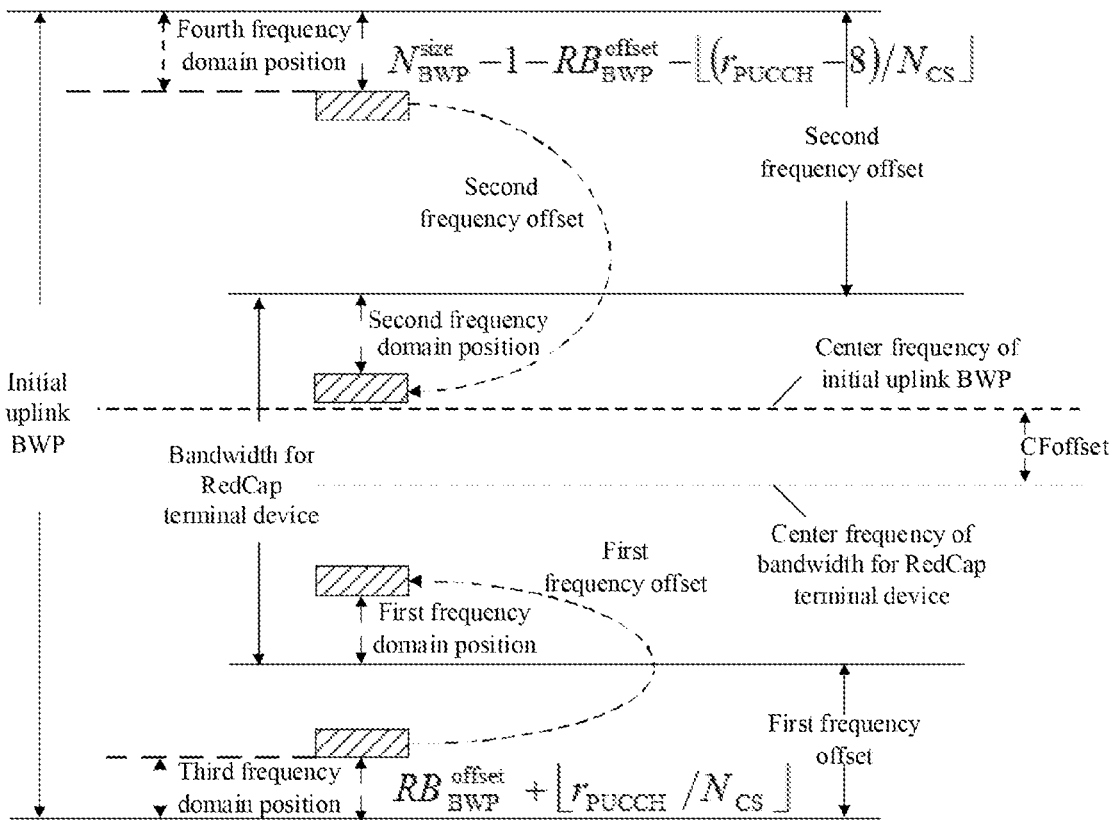
FIG. 5 is a schematic diagram of a relationship between a first PUCCH resource and a second PUCCH resource according to an embodiment of the present disclosure.

FIG. 5 illustrates a schematic diagram of a relationship between a first PUCCH resource and a second PUCCH resource. In some embodiments, a first frequency domain position of the second common PUCCH resource is obtained by adding the first frequency offset to a third frequency domain position of the first common PUCCH resource that is located in the initial uplink BWP; and a second frequency domain position of the second common PUCCH resource is obtained by subtracting the second frequency offset from a fourth frequency domain position of the first common PUCCH resource that is located in the initial uplink BWP. A frequency at the third frequency domain position is less than a frequency at the fourth frequency domain position. Herein, the resources used for a conventional terminal device (e.g. a terminal device without RedCap) to send HARQ feedback information are located at the third frequency domain position and the fourth frequency domain position.

The following is a comparative description of a method for determining resources for random access in the prior art and the method for determining resources for random access provided by the present disclosure.

Figure 6:
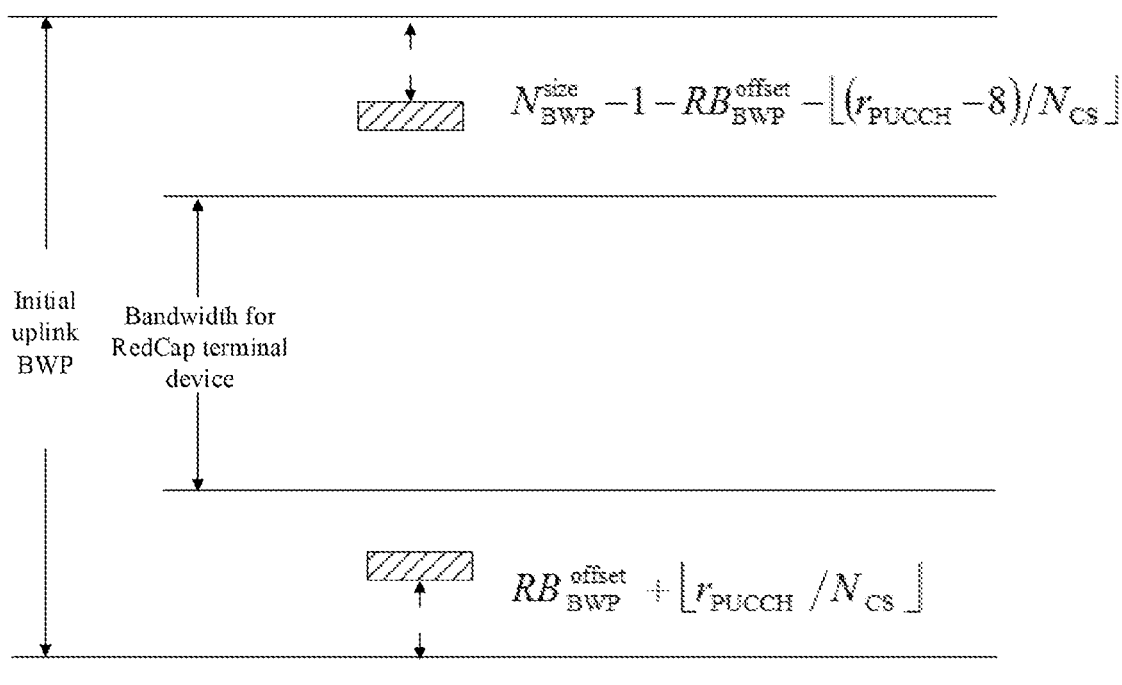
FIG. 6 is a schematic diagram of a Physical Resource Block (PRB) index of a first hopping of PUCCH according to an embodiment of the present disclosure.

In the prior art, the PRB of the resource, for sending HARQ feedback information, corresponding to the initial UL BWP is located at the third frequency domain position and the fourth frequency domain position as shown in FIG. 6, and an index of the PRB of the resource, for sending HARQ feedback information, corresponding to the initial UL BWP is increased from $$RB_{BWP}^{offset}$$

or decreased from $$N_{BWP}^{size} - 1 - RB_{BWP}^{offset}.$$

Figure 7:
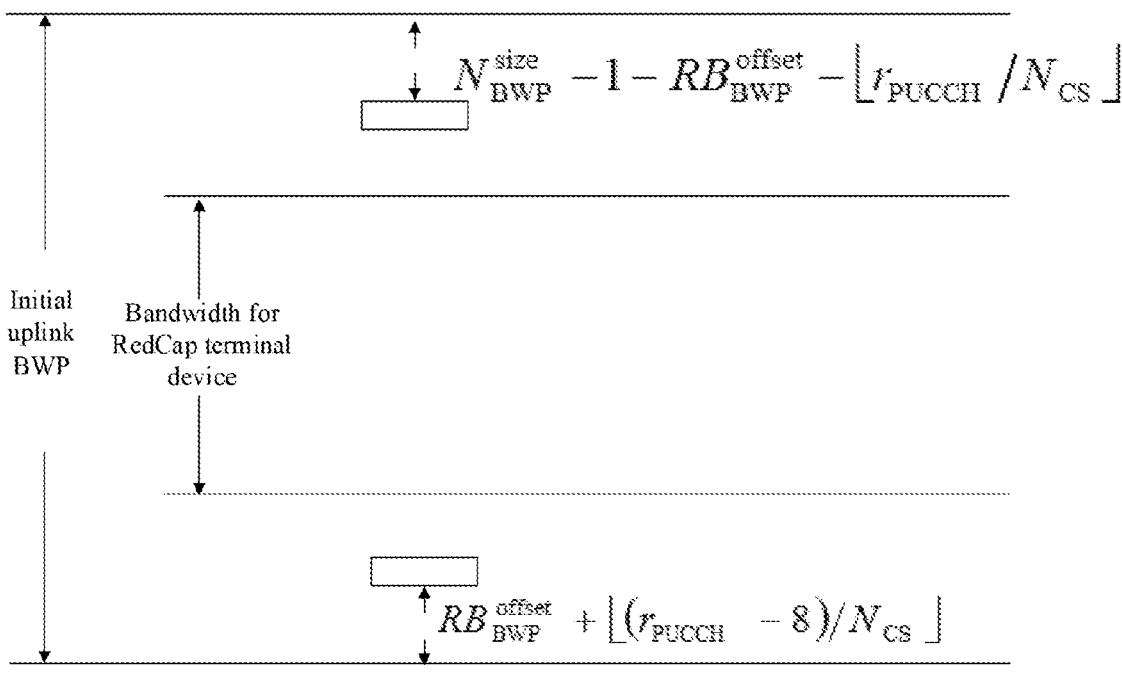
FIG. 7 is a schematic diagram of a PRB index of a second hopping of PUCCH according to an embodiment of the present disclosure.

For a PRB index of a PRB where the first hopping of the PUCCH is located, as shown in FIG. 6, it is determined that the PRB index is located at the third frequency domain position or the fourth frequency domain position within the initial UL BWP according to the value of $\gamma_{PUCCH}$. For PRB index of a PRB where the second hopping of PUCCH is located, as shown in FIG. 7, the second hopping of PUCCH and the first hopping of PUCCH are located at different frequency bands of the bandwidth of UL BWP. If the first hopping of PUCCH is located at the third frequency domain position, the second hopping of PUCCH is located at the fourth frequency domain position. According to FIG. 6 and FIG. 7, in a case where the initial UL BWP is greater than the bandwidth for the terminal device with RedCap, the frequency resource of the first common PUCCH resource may not be within the bandwidth for the terminal device with RedCap. In some scenarios, for example, when the center frequency of the initial UL BWP is aligned or very close to the center frequency of the bandwidth for the terminal device with RedCap, it may result in the terminal device with RedCap not having a common PUCCH resource available for transmitting HARQ feedback information.

Figure 8:
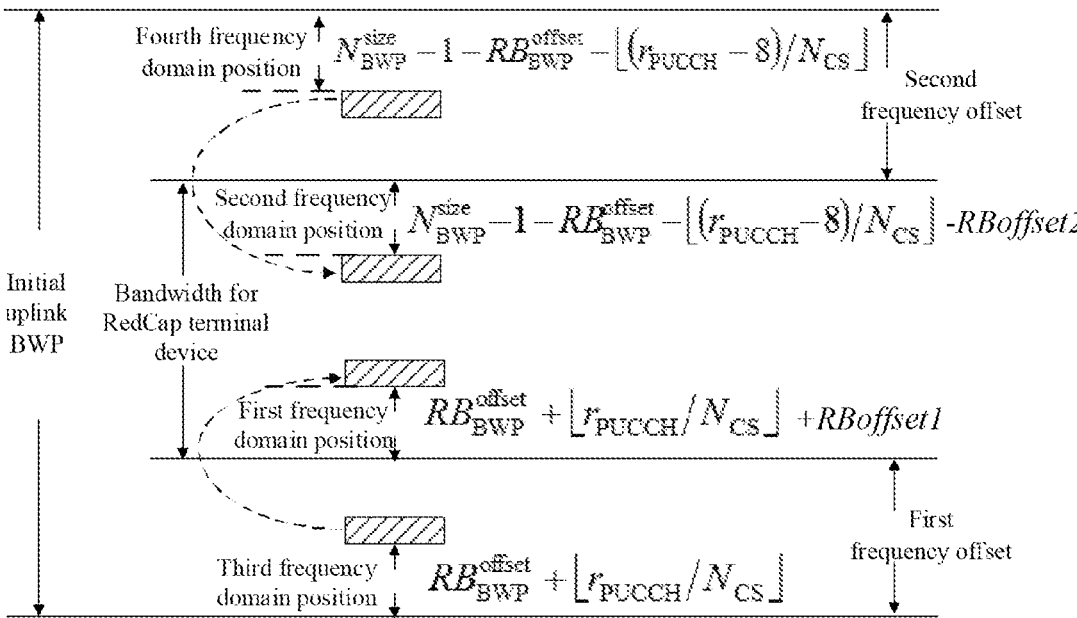
FIG. 8 is a schematic diagram of a second PUCCH resource according to an embodiment of the present disclosure.

In the method for determining resources for random access provided by the embodiments of the present disclosure, as shown in FIG. 8, a first frequency domain position of the second common PUCCH resource is obtained by adding the first frequency offset to a third frequency domain position of the first common PUCCH resource that is located in the initial uplink BWP; and a second frequency domain position of the second common PUCCH resource is obtained by subtracting the second frequency offset from a fourth frequency domain position of the first common PUCCH resource that is located in the initial uplink BWP. That is, the second common PUCCH resource for sending HARQ feedback information by the terminal device with RedCap is shifted to the center frequency of the initial UL BWP on the basis of the first common PUCCH resource, so that the frequency resource of the second common PUCCH resource is located within the range of the bandwidth for the terminal device with RedCap.

12

Specifically, if $\lfloor \gamma_{PUCCH}/8 \rfloor = 0$, PRB index of a first hopping for the PUCCH transmission is $$RB_{BWP}^{offset} + \lfloor \gamma_{PUCCH}/N_{CS} \rfloor + RBoffset1,$$

and a PRB index of a second hopping is $$N_{BWP}^{size} - 1 - RB_{BWP}^{offset} - \lfloor \gamma_{PUCCH}/N_{CS} \rfloor + RBoffset2,$$

where $N_{CS}$ represents the number of indexes in a set of initial cyclic shift (CS) indexes, an index of the initial cyclic shift is $\gamma_{PUCCH}$ mod $N_{CS}$, and $N_{BWP}^{size}$ represents the number of PRBs included in the initial uplink BWP.

If $\lfloor \gamma_{PUCCH}/8 \rfloor = 1$, the PRB index of the first hopping for the PUCCH transmission is $$N_{BWP}^{size} - 1 - RB_{BWP}^{offset} - \lfloor (\gamma_{PUCCH} - 8)/N_{CS} \rfloor + RBoffset2,$$

and the PRB index of the second hopping is $$RB_{BWP}^{offset} + \lfloor (\gamma_{PUCCH} - 8)/N_{CS} \rfloor + RBoffset1,$$

where $N_{CS}$ represents the number of indexes in a set of initial cyclic shift (CS) indexes, an index of the initial cyclic shift is $(\gamma_{PUCCH} - 8)$ mod $N_{CS}$, and $$N_{BWP}^{size}$$

represents the number of PRBs included in the initial uplink BWP.

In some embodiments, the initial UL BWP includes the bandwidth for the terminal device with RedCap.

In the method for determining resources for random access provided by the embodiments of the disclosure, the second common PUCCH resource used for sending HARQ feedback information by the terminal device with RedCap is shifted to the center frequency of the initial UL BWP on the basis of the first common PUCCH resource, for sending HARQ feedback information, corresponding to the initial UL BWP, so that the frequency resource of the second common PUCCH resource is located within the range of the bandwidth for the terminal device with RedCap, and thus an effective second common PUCCH resource for sending the HARQ feedback information is configured for the terminal device with RedCap.

FIG. 9 illustrates another optional process flow of the method for determining resources for random access according to an embodiment of the present disclosure, which may include the following operation S301.

In operation S301, a terminal device with RedCap determines a second common PUCCH resource based on configuration information of a first common PUCCH resource and a bandwidth for the terminal device with RedCap.

In some embodiments, the second common PUCCH resource is a resource, for sending HARQ feedback information, within the bandwidth for the terminal device with RedCap, and the first common PUCCH resource is a resource, for sending HARQ feedback information, corresponding to an initial uplink BWP.

In some embodiments, a PRB index of the second common PUCCH resource is determined based on the number of PRBs $$N_{BWP-r}^{SIZE}$$

included in the bandwidth for the terminal device with RedCap and a PRB offset $$RB_{BWP}^{offset}$$

in the configuration information of the first common PUCCH resource.

In some embodiments, a PRB index of the second common PUCCH resource is a PRB index within the bandwidth for the terminal device with RedCap, and the PRB index has a range from 0 to $$N_{BWP-r}^{SIZE} - 1,$$

where $$N_{BWP-r}^{SIZE}$$

represents the number of PRBs included in the bandwidth for the terminal device with RedCap.

In some embodiments, if $\lfloor \gamma_{P_{UCCH}}/8 \rfloor = 0$, a PRB index of a first hopping for the PUCCH transmission is $$RB_{BWP}^{offset} + \lfloor \gamma_{PUCCH}/N_{CS} \rfloor$$

and a PRB index of a second hopping for the PUCCH transmission is $$N_{BWP}^{size} - 1 - RB_{BWP}^{offset} - \lfloor \gamma_{PUCCH}/N_{CS} \rfloor \cdot \gamma_{PUCCH}$$

represents an index of a resource for sending the HARQ feedback information by the terminal device with RedCap, $N_{CS}$ represents the number of indexes in a set of initial CS indexes, $$RB_{BWP}^{offset}$$

represents a PRB offset in configuration information of the first common PUCCH resource, $$N_{BWP-r}^{SIZE}$$

represents the number of PRBs included in the bandwidth for the terminal device with RedCap, and an index of the initial cyclic shift is $\gamma_{PUCCH}$ mod $N_{CS}$.

If $\lfloor \gamma_{P_{UCCH}}/8 \rfloor = 1$, the PRB index of the first hopping for the PUCCH transmission is $$N_{BWP-r}^{size} - 1 - RB_{BWP}^{offset} - \lfloor (\gamma_{PUCCH} - 8)/N_{CS} \rfloor,$$

and the PRB index of the second hopping for the PUCCH transmission is $$RB_{BWP}^{offset} + \lfloor (\gamma_{PUCCH} - 8)/N_{CS} \rfloor \cdot \gamma_{PUCCH}$$

represents an index of a resource for sending the HARQ feedback information by the terminal device with RedCap, $N_{CS}$ represents the number of indexes in a set of initial CS indexes, $$RB_{BWP}^{offset}$$

represents a PRB offset in configuration information of the first common PUCCH resource, $$N_{BWP-r}^{SIZE}$$

represents the number of PRBs included in the bandwidth for BWP-r the terminal device, and an index of the initial cyclic shift is $(\gamma_{P_{UCCH}} - 8)$ mod $N_{CS}$.

In the embodiments of the present disclosure, a network device configures PUCCH resource configuration information for a terminal device, PUCCH resource indicator(s) is indicated by DCI, $n_{CCE,0}$ and $N_{CCE}$ are provided.

$$N_{BWP-r}^{SIZE}$$

represents the number of PRBs included in the bandwidth for the terminal device with RedCap, and $$N_{BWP-r}^{SIZE}$$

represents the number of PRBs included in the initial UL BWP. Based on $n_{CCE,0}$ and $N_{CCE}$, the PUCCH resource configuration information configured by the network device, and the PUCCH resource indicator(s) indicated by DCI, a method similar to the method for determining the PRB index is adopted, and a schematic diagram of a second common PUCCH resource determined by a terminal device with RedCap and a first common PUCCH resource determined by a terminal device without RedCap. As can be seen, the frequency domain positions of the second common PUCCH resources that are determined by the terminal device with RedCap based on the number of PRBs $$N_{BWP-r}^{SIZE}$$

included in the bandwidth for the terminal device with RedCap are all within the bandwidth for the terminal device with RedCap. The frequency domain positions of the first common PUCCH resources that are determined by the terminal device without RedCap based on the number of PRBs $$N_{BWP}^{SIZE}$$

included in the initial UL BWP are all within the initial UL BWP.

In some embodiments, the initial UL BWP includes the bandwidth for the terminal device with RedCap.

In the embodiments of the present disclosure, in the case where the initial UL BWP includes the bandwidth for the terminal device with RedCap, for the common PUCCH resource configured by the network device, on the basis of not changing configuration information of the existing common resource and the calculation method of the common PUCCH resource, the second common PUCCH resource can be determined based on the $$N_{BWP-r}^{SIZE}$$

representing the number of PRBs included in the bandwidth for the terminal device with RedCap, so that the second common PUCCH resource configured by the network device can be included in the bandwidth for the terminal device with RedCap, and thus the terminal device with RedCap sends the HARQ feedback information through the second common PUCCH resource in the random access procedure.

FIG. 11 illustrates another optional process flow of the method for determining resources for random access according to an embodiment of the present disclosure, which may include the following operation S401.

In operation S401, the network device determines a second common PUCCH resource based on a frequency domain position of a first common PUCCH resource and a frequency offset.

In some embodiments, the second common PUCCH resource is a resource, for sending HARQ feedback information, within a bandwidth for a terminal device with RedCap, and the first common PUCCH resource is a resource, for sending HARQ feedback information, corresponding to an initial uplink BWP. The first common PUCCH resource is configured by the network device.

In some embodiments, the frequency offset includes a first frequency offset and a second frequency offset.

In some embodiments, the network device may determine the frequency offset according to a predefined rule and then send the determined frequency offset to the terminal device with RedCap through system information or RRC signaling. If the network device does not send the frequency offset to the terminal device with RedCap through the system information or the RRC signaling, the terminal device with RedCap may also determine the frequency offset according to a predefined rule. The process of determining the frequency offset by the network device according to the predefined rule is the same as the process of determining the frequency offset by the terminal device with RedCap according to the predefined rule in the above operation S201, which will not be elaborated herein.

In some embodiments, the method may further include operation S402.

In operation S402, the network device sends system information or an RRC signaling, where the system information or the RRC signaling carries the frequency offset.

In some embodiments, the network device sends a frequency offset to the terminal device with RedCap through the system information or the RRC signaling, so that the terminal device determines the second PUCCH resource based on a frequency domain position of a first common PUCCH resource and a frequency offset.

FIG. 12 illustrates another optional process flow of the method for determining resources for random access according to an embodiment of the present disclosure, which may include operation S501.

In operation S501, a network device determines a second common PUCCH resource based on configuration information of a first common PUCCH resource and a bandwidth for a terminal device with RedCap.

In some embodiments, the second common PUCCH resource is a resource, for sending HARQ feedback information, within the bandwidth for the terminal device with RedCap, and the first common PUCCH resource is a resource, for sending HARQ feedback information, corresponding to an initial uplink BWP.

In some embodiments, the initial UL BWP includes the bandwidth for the terminal device with RedCap.

In some embodiments, a PRB index of the second common PUCCH resource is determined based on the number of PRBs $$N_{BWP-r}^{SIZE}$$

included in the bandwidth for the terminal device with RedCap and a PRB offset $$RB_{BWP}^{offset}$$

in the configuration information of the first common PUCCH resource.

In some embodiments, a PRB index of the second common PUCCH resource is a PRB index within the bandwidth for the terminal device with RedCap, and the PRB index has a range from 0 to $$N_{BWP-r}^{SIZE} - 1,$$

where $$N_{BWP-r}^{SIZE}$$

represents the number of PRBs included in the bandwidth for the terminal device with RedCap.

In some embodiments, if $\lfloor \gamma_{PUCCH}/8 \rfloor = 0$, a PRB index of a first hopping of the PUCCH transmission is $$RB_{BWP}^{offset} + \lfloor \gamma_{PUCCH}/N_{CS} \rfloor;$$

and a PRB index of a second hopping of the PUCCH transmission is $$N_{BWP-r}^{size} - 1 - RB_{BWP}^{offset} - \lfloor \gamma_{PUCCH}/N_{CS} \rfloor \cdot \gamma_{PUCCH}$$

represents an index of a resource for sending the HARQ feedback information by the terminal device with RedCap, $N_{CS}$ represents the number of indexes in a set of initial CS indexes, $$RB_{BWP}^{offset}$$

represents a PRB offset in configuration information of the first common PUCCH resource, $$N_{BWP-r}^{size}$$

represents the number of PRBs included in the bandwidth for the terminal device, and an index of the initial cyclic shift is $\gamma_{PUCCH}$ mod $N_{CS}$.

If $\lfloor \gamma_{PUCCH}/8 \rfloor = 1$, the PRB index of the first hopping of the PUCCH transmission is $$N_{BWP-r}^{size} - 1 - RB_{BWP}^{offset} - \lfloor (\gamma_{PUCCH} - 8)/N_{CS} \rfloor,$$

and the PRB index of the second hopping of the PUCCH transmission is $$RB_{BWP}^{offset} + \lfloor (\gamma_{PUCCH} - 8)/N_{CS} \rfloor \cdot \gamma_{PUCCH}$$

represents an index of a resource for sending the HARQ feedback information by the terminal device with RedCap, $N_{CS}$ represents the number of indexes in a set of initial CS indexes, $$RB_{BWP}^{offset}$$

represents a PRB offset in configuration information of the first common PUCCH resource, $$N_{BWP-r}^{SIZE}$$

represents the number of PRBs included in the bandwidth for the terminal device, and an index of the initial cyclic shift is $(\gamma_{PUCCH} - 8)$ mod $N_{CS}$.

Figure 10:
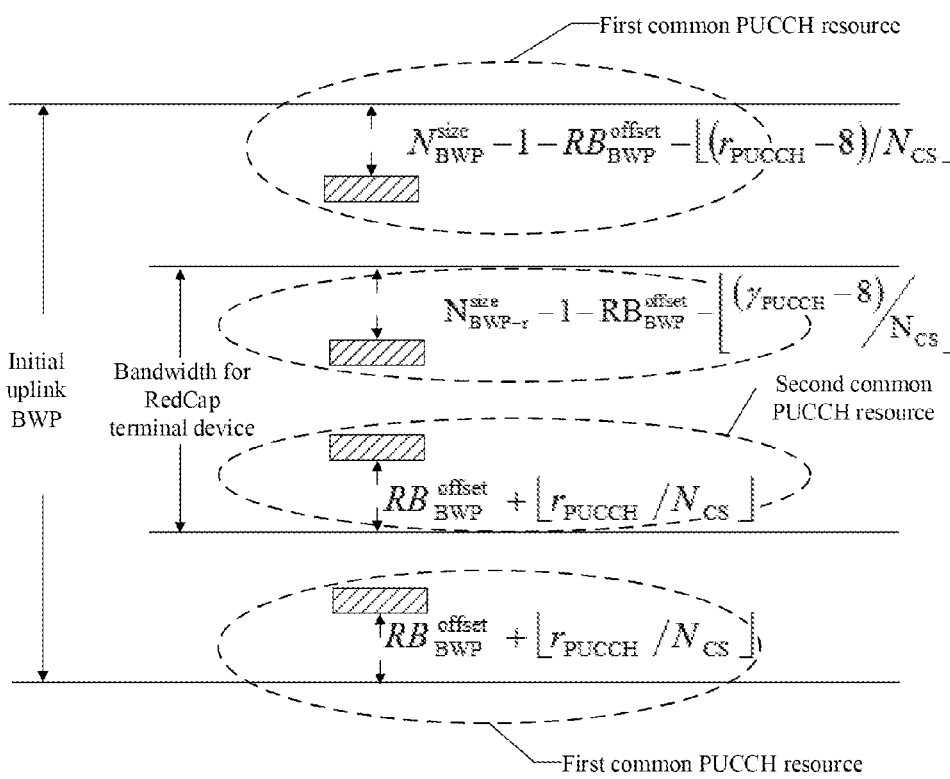
FIG. 10 is a schematic diagram of a first common PUCCH resource determined by a terminal device with RedCap and a second common PUCCH resource determined by a terminal device without RedCap according to an embodiment of the present disclosure.

In the embodiments of the present disclosure, a network device configures for the terminal device the PUCCH resource configuration information, PUCCH resource indicator(s) is indicated by DCI, $n_{CCE,0}$ and $N_{CCE}$ are provided.

$$N_{BWP-r}^{SIZE}$$

represents the number of PRBs included in the bandwidth for the terminal device with RedCap, and $$N_{BWP}^{SIZE}$$

represents the number of PRBs included in the initial UL BWP. Based on $n_{CCE,\ 0}$ and $N_{CCE}$, the PUCCH resource configuration information configured by the network device, and the PUCCH resource indicator indicated by DCI, a method similar to the method for determining the PRB index is adopted, and a schematic diagram of a second common PUCCH resource determined by a terminal device with RedCap and a first common PUCCH resource determined by a terminal device without RedCap is shown in FIG. 10. As can be seen, the frequency domain positions of the second common PUCCH resources that are determined by the terminal device with RedCap based on the number of PRBs $$N_{BWP-r}^{SIZE}$$

included in the bandwidth for the terminal device with RedCap are all within the bandwidth for the terminal device with RedCap. The frequency domain positions of the first common PUCCH resources that are determined by the terminal device without RedCap based on the number of PRBs $$N_{BWP}^{SIZE}$$

included in the initial UL BWP are all within the initial UL BWP.

Figure 13:
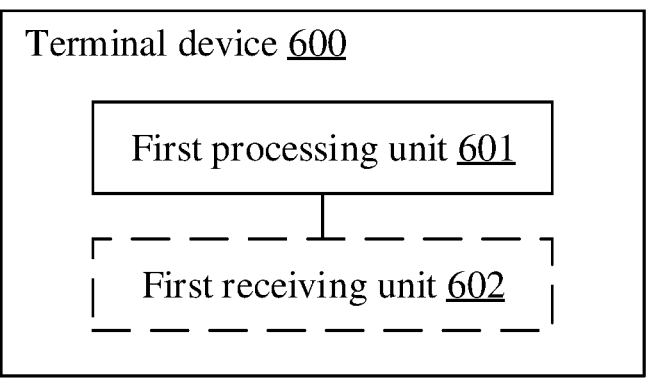
FIG. 13 is a schematic diagram of an optional composition structure of a terminal device according to an embodiment of the present disclosure.

In some embodiments, the network device may also separately configure configuration information of second common PUCCH resource within the bandwidth corresponding to the terminal device with RedCap for the terminal device with RedCap, for example, the network device separately configures pucch-ResourceCommon information for the terminal device with RedCap, and $$RB_{BWP}^{offset}$$

and $N_{CS}$ included in the pucch-ResourceCommon information are used separately for the terminal device with RedCap. The parameters in the configuration information of the second common PUCCH resource and the parameters in the configuration information of the first common PUCCH resource corresponding to the initial uplink BWP configured by the network device may be identical or different. In the case where the parameters in the configuration information of the second common PUCCH resource are different from those in the configuration information of the first common PUCCH resource, the parameters in the configuration information of the second common PUCCH resource may be completely different from or partially identical to those in the configuration information of the first common PUCCH resource. In this scenario, $N_{BWP-r}^{SIZE}$ may be the number of PRBs of the initial uplink BWP configured separately for the terminal device with RedCap, and correspondingly, the bandwidth corresponding to the terminal device with Red- Cap may be the initial uplink BWP configured by the network device for the terminal device with RedCap In order to realize the method for determining resources for random access provided by the embodiment of the present disclosure, the embodiment of the present disclosure also provides a terminal device. The optional composition structure of the terminal device 600, as shown in FIG. 13, includes a first processing unit 601.

The first processing unit 601 is configured to determine a second common PUCCH resource based on a frequency domain position of a first common PUCCH resource and a frequency offset.

The second common PUCCH resource is a resource, for sending HARQ feedback information, within a bandwidth for the terminal device with RedCap, and the first common PUCCH resource is a resource, for sending HARQ feedback information, corresponding to an initial uplink BWP.

In some embodiments, the frequency offset includes a first frequency offset and a second frequency offset.

In some embodiments, the frequency offset is configured by a network device through system information; or the frequency offset is configured by the network device through an RRC signaling.

Correspondingly, the terminal device 600 may further include a first receiving unit 602 configured to receive the system information or RRC signaling sent from the network device.

In some embodiments, the frequency offset is determined according to a predefined rule.

In some embodiments, the predefined rule includes that: the frequency offset is determined based on a relationship between the initial uplink BWP and the bandwidth for the terminal device with RedCap.

In some embodiments, the frequency offset includes a first frequency offset and a second frequency offset.

The first frequency offset is equal to a difference between half of a difference between the initial uplink BWP and the bandwidth for the terminal device with RedCap and a difference between a center frequency of the initial uplink BWP and a center frequency of the bandwidth for the terminal device with RedCap.

The second frequency offset is equal to a sum of half of the difference between the initial uplink BWP and the bandwidth for the terminal device with RedCap and the difference between the center frequency of the initial uplink BWP and the center frequency of the bandwidth for the terminal device with RedCap.

In some embodiments, a first frequency domain position of the second common PUCCH resource is obtained by adding the first frequency offset to a third frequency domain position of the first common PUCCH resource that is located in the initial uplink BWP.

A second frequency domain position of the second common PUCCH resource is obtained by subtracting the second frequency offset from a fourth frequency domain position of the first common PUCCH resource that is located in the initial uplink BWP.

The frequency at the third frequency domain position is less than a frequency at the fourth frequency domain position.

In some embodiments, a PRB index of a first hopping of the second common PUCCH resource is:

$$RB_{BWP}^{offset} + \lfloor \gamma_{PUCCH}/N_{CS} \rfloor + RBoffset1.$$

The PRB index of a second hopping of the second common PUCCH resource is:

$$N_{BWP}^{size} - 1 - RB_{BWP}^{offset} - \lfloor \gamma_{PUCCH}/N_{CS} \rfloor + RBoffset2.$$

$\gamma_{PUCCH}$ represents an index of a resource for sending the HARQ feedback information by the terminal device with RedCap, $N_{CS}$ represents the number of indexes in a set of initial cyclic shift (CS) indexes, $$N_{BWP}^{size}$$

represents the number of PRBs included in the initial uplink BWP, $$RB_{BWP}^{offset}$$

represents a PRB offset in configuration information of the first common PUCCH resource, RBoffset1 represents the first frequency offset and RBoffset2 represents the second frequency offset.

In some embodiments, a PRB index of a first hopping of the second common PUCCH resource is:

$$N_{BWP}^{size} - 1 - RB_{BWP}^{offset} - \lfloor (\gamma_{PUCCH} - 8)/N_{cs} \rfloor - RBoffset2.$$

The PRB index of a second hopping of the second common PUCCH resource is:

$$RB_{BWP}^{offset} + \lfloor (\gamma_{PUCCH} - 8)/N_{cs} \rfloor + RBoffset1.$$

$\gamma_{PUCCH}$ represents an index of a resource for sending the HARQ feedback information by the terminal device with RedCap, $N_{CS}$ represents the number of indexes in a set of initial cyclic shift (CS) indexes, $$N_{BWP}^{size}$$

represents the number of PRBs included in the initial uplink BWP, $$RB_{BWP}^{offset}$$

represents a PRB offset in configuration information of the first common PUCCH resource, RBoffset1 represents the first frequency offset and RBoffset2 represents the second frequency offset.

In some embodiments, the initial uplink BWP includes the bandwidth for the terminal device with RedCap.

Figure 14:
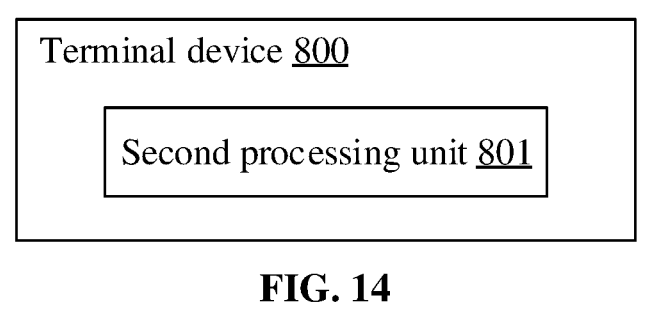

In order to realize the method for determining resources for random access provided by the embodiments of the present disclosure, embodiments of the present disclosure also provide another terminal device. The optional composition structure of the terminal device 800, as shown in FIG. 14, includes a second processing unit 801.

The second processing unit 801 is configured to determine a second common PUCCH resource based on configuration information of a first common PUCCH resource and a bandwidth for the terminal device with RedCap.

The second common PUCCH resource is a resource, for sending HARQ feedback information, within the bandwidth for a terminal device with RedCap, and the first common PUCCH resource is a resource, for sending HARQ feedback information, corresponding to an initial uplink BWP.

In some embodiments, a PRB index of the second common PUCCH resource is determined based on the number of PRBs included in the bandwidth for the terminal device with RedCap and a PRB offset in the configuration information of the first common PUCCH resource.

In some embodiments, a PRB index of the second common PUCCH resource is a PRB index within the bandwidth for the terminal device with RedCap, and the PRB index has a range from $$N_{BWP-r}^{size} - 1,$$

where $$N_{BWP-r}^{size}$$

represents the number of PRBs included in the bandwidth for the terminal device with RedCap.

In some embodiments, a PRB index of a first hopping of the second common PUCCH resource is:

$$RB_{BWP}^{offset} + \lfloor (\gamma_{PUCCH} - 8)/N_{cs} \rfloor.$$

The PRB index of a second hopping of the second common PUCCH resource is:

$$N_{BWP-r}^{st} - 1 - RB_{BWP}^{offset} - \lfloor (\gamma_{PUCCH} - 8)/N_{cs} \rfloor.$$

$\gamma_{PUCCH}$ represents an index of a resource for sending the HARQ feedback information by the terminal device with RedCap, $N_{CS}$ represents the number of indexes in a set of initial CS indexes, $$RB_{BWP}^{offset}$$

represents a PRB offset in configuration information of the first common PUCCH resource, $$N_{BWP-r}^{size}$$

represents the number of PRBs included in the bandwidth for the terminal device with RedCap.

In some embodiments, a PRB index of a first hopping of the second common PUCCH resource is:

$$N_{BWP-r}^{size} - 1 - RB_{BWP}^{offset} - \lfloor (\gamma_{PUCCH} - 8)/N_{cs} \rfloor.$$

The PRB index of a second hopping of the second common PUCCH resource is:

$$RB_{BWP}^{offset} + \lfloor (\gamma_{PUCCH} - 8)/N_{cs} \rfloor.$$

$\gamma_{PUCCH}$ represents an index of a resource for sending the HARQ feedback information by the terminal device with RedCap, $N_{CS}$ represents the number of indexes in a set of initial CS indexes, $$RB_{BWP}^{offset}$$

represents a PRB offset in configuration information of the first common PUCCH resource, $$N_{BWP-r}^{size}$$

represents the number of PRBs included in the bandwidth for the terminal device with RedCap.

In some embodiments, the initial uplink BWP includes the bandwidth for the terminal device with RedCap.

Figure 15:
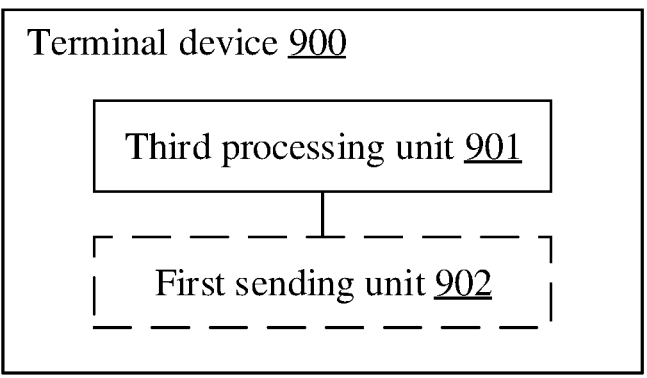
FIG. 15 is a schematic diagram of an optional composition structure of a network device according to an embodiment of the present disclosure.

In order to realize the method for determining resources for random access provided by the embodiments of the present disclosure, embodiments of the present disclosure also provide a network device. The optional composition structure of the network device 900, as shown in FIG. 15, includes a third processing unit 901.

The third processing unit 901 is configured to determine a second common PUCCH resource based on a frequency domain position of a first common PUCCH resource and a frequency offset.

The second common PUCCH resource is a resource, for sending HARQ feedback information, within a bandwidth for a terminal device with RedCap, and the first common PUCCH resource is a resource, for sending HARQ feedback information, corresponding to an initial uplink BWP.

In some embodiments, the frequency offset includes a first frequency offset and a second frequency offset.

In some embodiments, the network device 900 further includes a first sending unit 902.

The first sending unit 902 is configured to send system information or an RRC signaling, where the system information or the RRC signaling carries the frequency offset.

In some embodiments, the frequency offset is determined according to a predefined rule.

In some embodiments, the predefined rule includes that: the frequency offset is determined based on a relationship between the initial uplink BWP and the bandwidth for the terminal device with RedCap.

In some embodiments, the frequency offset includes a first frequency offset and a second frequency offset.

The first frequency offset is equal to a difference between half of a difference between the initial uplink BWP and the bandwidth for the terminal device with RedCap and a difference between a center frequency of the initial uplink BWP and a center frequency of the bandwidth for the terminal device with RedCap.

The second frequency offset is equal to a sum of half of the difference between the initial uplink BWP and the bandwidth for the terminal device with RedCap and the difference between the center frequency of the initial uplink BWP and the center frequency of the bandwidth for the terminal device with RedCap.

In some embodiments, a first frequency domain position of the second common PUCCH resource is obtained by adding the first frequency offset to a third frequency domain position of the first common PUCCH resource that is located in the initial uplink BWP.

A second frequency domain position of the second common PUCCH resource is obtained by subtracting the second frequency offset from a fourth frequency domain position of the first common PUCCH resource that is located in the initial uplink BWP.

The frequency of at the third frequency domain position is less than a frequency of at the fourth frequency domain position.

In some embodiments, a PRB index of a first hopping of the second common PUCCH resource is:

$$RB_{BWP}^{offset} + \lfloor (\gamma_{PUCCH} - 8)/N_{cs} \rfloor . + RBoffset1.$$

The PRB index of a second hopping of the second common PUCCH resource is:

$$N_{BWP}^{size} - 1 - RB_{BWP}^{offset} - \lfloor \gamma_{PUCCH}/N_{CS} \rfloor - RBoffset2.$$

$\gamma_{PUCCH}$ represents an index of a resource for sending the HARQ feedback information by the terminal device with RedCap, $N_{CS}$ represents the number of indexes in a set of initial cyclic shift (CS) indexes, $$N_{BWP}^{size}$$

represents the number of PRBs included in the initial uplink BWP, $$RB_{BWP}^{offset}$$

represents a PRB offset in configuration information of the first common PUCCH resource, RBoffset1 represents the first frequency offset and RBoffset2 represents the second frequency offset.

In some embodiments, a PRB index of a first hopping of the second common PUCCH resource is:

$$N_{BWP}^{size} - 1 - RB_{BWP}^{offset} - \lfloor (\gamma_{PUCCH} - 8)/N_{CS} \rfloor - RBoffset2.$$

The PRB index of a second hopping of the second common PUCCH resource is:

$$RB_{BWP}^{offset} + \lfloor (\gamma_{PUCCH} - 8)/N_{CS} \rfloor + RBoffset1.$$

$\gamma_{PUCCH}$ represents an index of a resource for sending the HARQ feedback information by the terminal device with RedCap, $N_{CS}$ represents the number of indexes in a set of initial cyclic shift (CS) indexes, $$N_{BWP}^{size}$$

represents the number of PRBs included in the initial uplink BWP, $$RB_{BWP}^{offset}$$

represents a PRB offset in configuration information of the first common PUCCH resource, RBoffset1 represents the first frequency offset and RBoffset2 represents the second frequency offset.

In some embodiments, the initial uplink BWP includes the bandwidth for the terminal device with RedCap.

Figure 16:
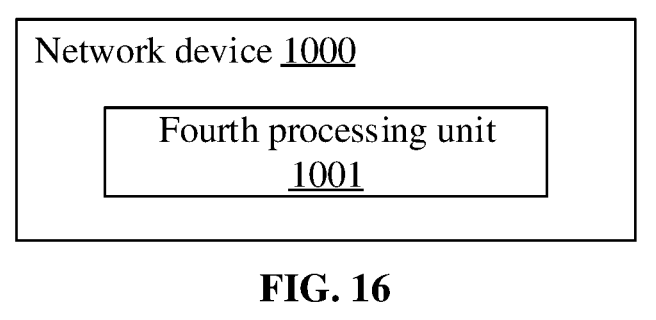

In order to realize the method for determining resources for random access provided by the embodiments of the present disclosure, embodiments of the present disclosure also provide another network device. The optional composition structure of the network device 1000, as shown in FIG. 16, includes a fourth processing unit 1001.

The fourth processing unit 1001 is configured to determine a second common PUCCH resource based on configuration information of a first common PUCCH resource and a bandwidth for a terminal device with RedCap.

The second common PUCCH resource is a resource, for sending HARQ feedback information, within the bandwidth for the terminal device with RedCap, and the first common PUCCH resource is a resource, for sending HARQ feedback information, corresponding to an initial uplink BWP.

In some embodiments, a PRB index of the second common PUCCH resource is determined based on the number of PRBs included in the bandwidth for the terminal device with RedCap and a PRB offset in the configuration information of the first common PUCCH resource.

In some embodiments, a PRB index of the second common PUCCH resource is a PRB index within the bandwidth for the terminal device with RedCap, and the PRB index has a range from 0 to $$N_{BWP-r}^{SIZE} - 1,$$

where $$N_{BWP-r}^{SIZE}$$

represents the number of PRBs included in the bandwidth for the terminal device with RedCap.

In some embodiments, a PRB index of a first hopping of the second common PUCCH resource is:

$$RB_{BWP}^{offset} + \lfloor \gamma_{PUCCH}/N_{CS} \rfloor.$$

The PRB index of a second hopping of the second common PUCCH resource is:

$$N_{BWP-r}^{size} - 1 - RB_{BWP}^{offset} - \lfloor \gamma_{PUCCH}/N_{CS} \rfloor.$$

$\gamma_{PUCCH}$ represents an index of a resource for sending the HARQ feedback information by the terminal device with RedCap, $N_{CS}$ represents the number of indexes in a set of initial CS indexes, an index of the initial cyclic shift is PUCCH mod $N_{CS}$, and $$N_{BWP-r}^{SIZE}$$

represents the number of PRBs included in the bandwidth for the terminal device with RedCap.

In some embodiments, a PRB index of a first hopping of the second common PUCCH resource is:

$$N_{BWP-r}^{size} - 1 - RB_{BWP}^{offset} - \lfloor (\gamma_{PUCCH} - 8)/N_{CS} \rfloor.$$

The PRB index of a second hopping of the second common PUCCH resource is:

$$RB_{BWP}^{offset} - \lfloor (\gamma_{PUCCH} - 8)/N_{CS} \rfloor.$$

$\gamma_{PUCCH}$ represents an index of a resource for sending the HARQ feedback information by the terminal device with RedCap, $N_{CS}$ represents the number of indexes in a set of initial CS indexes, an index of the initial cyclic shift is $(\gamma_{PUCCH}-8)$ mod $N_{CS}$, $$N_{BWP-r}^{SIZE}$$

represents the number of PRBs included in the bandwidth for the terminal device with RedCap.

In some embodiments, the initial uplink BWP includes the bandwidth for the terminal device with RedCap.

It should be noted that in the embodiments of the present disclosure, the functions of each of the first processing unit 601, the second processing unit 801, the third processing unit 901 and the fourth processing unit 1001 can be implemented by a processor, the functions of the first sending unit 902 can be implemented by a transmitter or transceiver, and the functions of the first receiving unit 602 can be implemented by a receiver or transceiver.

Embodiments of the present disclosure also provide a terminal device, including a processor and a memory configured to store computer programs capable of running on the processor. The processor is configured to implement, when running the computer programs, the operations of the method for determining resources for random access performed by the terminal device as described above.

Embodiments of the present disclosure also provide a network device, including a processor and a memory configured to store computer programs capable of running on the processor. The processor is configured to implement, when running the computer programs, the operations of the method for determining resources for random access performed by the network device as described above.

Embodiments of the present disclosure also provide a chip including a processor configured to invoke and run computer programs from a memory, to cause a device installed with the chip to perform the method for determining resources for random access performed by the terminal device as described above.

Embodiments of the present disclosure also provide a chip including a processor configured to invoke and run computer programs from a memory, to cause a device installed with the chip to perform the method for determining resources for random access performed by the network device as described above.

Embodiments of the present disclosure also provide a storage medium having stored thereon executable programs that, when executed by a processor, cause the processor to implement the method for determining resources for random access performed by the terminal device as described above.

Embodiments of the present disclosure also provide a storage medium having stored thereon executable programs that, when executed by a processor, cause the processor to implement the method for determining resources for random access performed by the network device as described above.

Embodiments of the present disclosure also provide a computer program product including computer program instructions. The computer program instructions cause a computer to perform the method for determining resources for random access performed by the terminal device as described above.

Embodiments of the present disclosure also provide a computer program product including computer program instructions. The computer program instructions cause a computer to perform the method for determining resources for random access performed by the network device as described above.

Embodiments of the present disclosure also provide a computer program causing a computer to perform the method for determining resources for random access performed by the terminal device as described above.

Embodiments of the disclosure also provide a computer program causing a computer to perform the method for determining resources for random access performed by the network device as described above.

Figure 17:
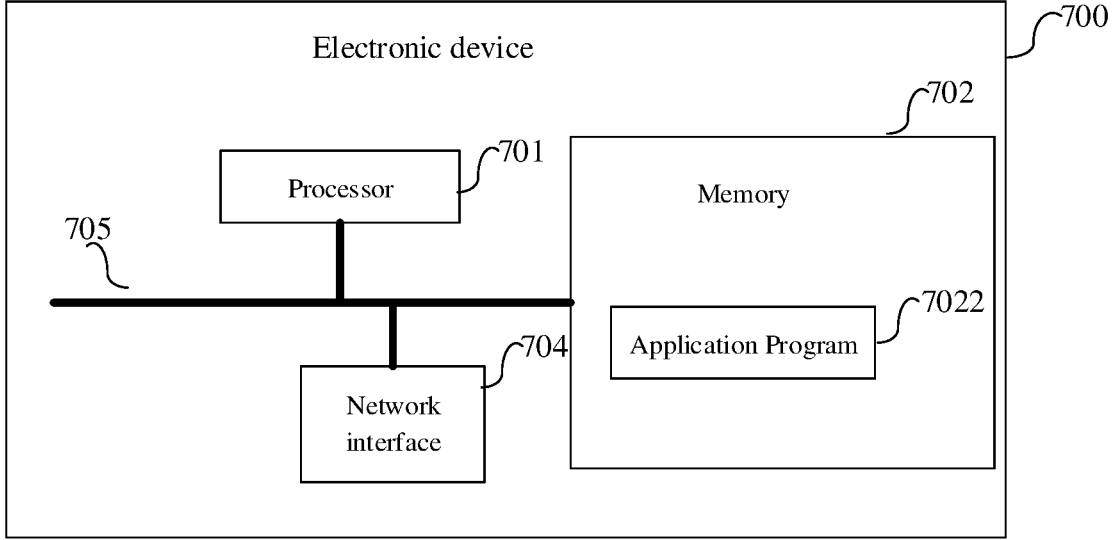
FIG. 17 is a schematic diagram of a hardware composition structure of an electronic device according to an embodiment of the present disclosure.

FIG. 17 is a schematic diagram of a hardware structure of an electronic device (terminal device or network device) according to an embodiment of the present disclosure. The electronic device 700 includes at least one processor 701, a memory 702 and at least one network interface 704. Various components in the electronic device 700 are coupled together by a bus system 705. It can be understood that the bus system 705 is used for implementing connection communications between these components. The bus system 705 includes a power bus, a control bus and a status signal bus in addition to a data bus. However, for clarity, all the buses are designated as bus system 705 in FIG. 17.

It will be appreciated that the memory 702 may be a volatile memory or non-volatile memory, or may also include both volatile and non-volatile memory. The non-volatile memory can be Read-Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory, magnetic surface memory, Optical Disk, or Compact Disc Read ad-Only Memory (CD-ROM). The magnetic surface memory may be a magnetic disk memory or a magnetic tape memory. The volatile memory may be Random Access Memory (RAM) which serves as an external cache. By way of illustration, but not limitation, many forms of RAM are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM). The memory 702 described in the embodiments of the present disclosure is intended to include but not limited to these and any other suitable types of memory.

The memory 702 in the embodiments of the present disclosure is configured to store various types of data to support the operations of the electronic device 700. Examples of such data include any computer program, such as application program 7022, for operating on the electronic device 700. The programs for implementing the method of the embodiments of the present disclosure may be included in the application program 7022.

The methods disclosed in the above embodiments of the present disclosure may be applied to or implemented by the processor 701. The processor 701 may be an integrated circuit chip with signal processing capability. In the implementation process, each step of the above method embodiment can be completed by integrated logic circuit of hardware in the processor 701 or instructions in the form of software. The processor 701 can be a general-purpose processor, a digital signal processor (DSPS), or other programmable logic devices, discrete gate or transistor logic devices, and discrete hardware components. The disclosed methods, steps and logic block diagrams in the embodiments of the present disclosure can be implemented or executed by the processor 701. The general-purpose processor may be a microprocessor or any conventional processor or the like. The steps of the method disclosed in connection with the embodiments of the present disclosure can be directly embodied as completion of the execution of the hardware decoding processor, or by the combination of the hardware and software modules in the decoding processor. The software modules can be located storage media. The storage medium is located in the memory 702, and the processor 701 reads the information in the memory 702 and completes the steps of the above method in combination with its hardware.

In an exemplary embodiment, the electronic device 700 may be implemented by one or more Application Specific Integrated Circuits (ASICs), DSP, Programmable Logic Devices (PLDs), Complex Programmable Logic Devices (CPLDs), FPGAs, General Purpose Processors, Controllers, MCUs, MPUs, or other electronic components to perform the foregoing methods.

The present disclosure is described with reference to flowcharts and/or block diagrams of methods, devices (systems), and computer program products of the embodiments of the present disclosure. It should be understood that a computer program instruction is configured to implement each flow and/or block in the flowcharts and/or block diagrams, and the combination of flows/blocks in the flowcharts and/or block diagrams. These computer program instructions may be provided to a universal computer, a special computer, an embedded processor or processors of other programmable data processing devices to generate a machine, such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the operations for implementing the functions specified in one or more flows in the flowchart and/or one or more blocks in the block diagram.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The above is only preferable embodiments of the disclosure and not intended to limit the scope of protection of the disclosure. Any variations, equivalent replacement and improvement within the technical scope disclosed by the disclosure shall fall within the scope of protection of the disclosure.

The invention claimed is:

1. A method for determining resources for random access, comprising:

determining, by a terminal device with reduced capability (RedCap), a second common Physical Uplink Control Channel (PUCCH) resource based on a frequency domain position of a first common PUCCH resource and a frequency offset, wherein the second common PUCCH resource is a resource, for sending Hybrid Automatic Repeat Request (HARQ) feedback information, within a bandwidth for the terminal device with RedCap, and the first common PUCCH resource is a resource, for sending HARQ feedback information, corresponding to an initial uplink bandwidth part (BWP), wherein the frequency offset comprises a first frequency offset and a second frequency offset, wherein a first frequency domain position of the second common PUCCH resource is obtained by adding the first frequency offset to a third frequency domain position of the first common PUCCH resource that is located in the initial uplink BWP;

a second frequency domain position of the second common PUCCH resource is obtained by subtracting the second frequency offset from a fourth frequency domain position of the first common PUCCH resource that is located in the initial uplink BWP; and a frequency at the third frequency domain position is less than a frequency at the fourth frequency domain position.

2. The method of claim 1, wherein the frequency offset is configured by a network device through system information; or the frequency offset is configured by a network device through a Radio Resource Control (RRC) signaling.

3. The method of claim 1, wherein a Physical Resource Block (PRB) index of the first frequency domain position of the second common PUCCH resource is: $RB_{BWP}^{offset}+\lfloor\gamma_{PUCCH}/N_{CS}\rfloor+RBoffset1$; and a PRB index of the second frequency domain position of the second common PUCCH resource is: $N_{BWP}^{size}-1-RB_{BWP}^{offset}-\lfloor\gamma_{PUCCH}/N_{CS}\rfloor-RBoffset2$, wherein $\gamma_{PUCCH}$ represents an index of the resource for sending the HARQ feedback information corresponding to the initial uplink BWP by the terminal device with RedCap, $N_{CS}$ represents a number of indexes in a set of initial cyclic shift (CS) indexes, $N_{BWP}^{size}$ represents a number of PRBs included in the initial uplink BWP, $RB_{BWP}^{offset}$ represents a PRB offset in configuration information of the first common PUCCH resource, RBoffset1 represents the first frequency offset, and RBoffset2 represents the second frequency offset.

4. The method of claim 1, wherein a PRB index of the first frequency domain position of the second common PUCCH resource is: $N_{BWP}^{size}-1-RB_{BWP}^{offset}-\lfloor(\gamma_{PUCCH}-8)/N_{CS}\rfloor-RBoffset2$; and a PRB index of a second frequency domain position of the second common PUCCH resource is: $RB_{BWP}^{offset}+\lfloor(\gamma_{PUCCH}-8)/N_{CS}\rfloor+RBoffset1$, where $\gamma_{PUCCH}$ represents an index of the resource for sending the HARQ feedback information corresponding to the initial uplink BWP by the terminal device with RedCap, $N_{CS}$ represents a number of indexes in a set of initial cyclic shift (CS) indexes, $N_{BWP}^{size}$ represents a number of PRBs included in the initial uplink BWP, $RB_{BWP}^{offset}$ represents a PRB offset in configuration information of the first common PUCCH resource, RBoffset1 represents the first frequency offset and RBoffset2 represents the second frequency offset.

5. The method of claim 1, wherein the initial uplink BWP comprises the bandwidth for the terminal device with RedCap.

6. A terminal device, wherein the terminal device is a terminal device with reduced capability (RedCap) and comprises:

at least one processor, configured to determine a second common Physical Uplink Control Channel (PUCCH) resource based on a frequency domain position of a first common PUCCH resource and a frequency offset, wherein the second common PUCCH resource is a resource, for sending Hybrid Automatic Repeat Request (HARQ) feedback information, within a bandwidth for the terminal device with RedCap, and the first common PUCCH resource is a resource, for sending HARQ feedback information, corresponding to an initial uplink bandwidth part (BWP), wherein the frequency offset comprises a first frequency offset and a second frequency offset, wherein a first frequency domain position of the second common PUCCH resource is obtained by adding the first frequency offset to a third frequency domain position of the first common PUCCH resource that is located in the initial uplink BWP;

a second frequency domain position of the second common PUCCH resource is obtained by subtracting the second frequency offset from a fourth frequency domain position of the first common PUCCH resource that is located in the initial uplink BWP; and a frequency at the third frequency domain position is less than a frequency at the fourth frequency domain position.

7. The terminal device of claim 6, wherein the frequency offset is configured by a network device through system information; or the frequency offset is configured by the network device through a Radio Resource Control (RRC) signaling.

8. The terminal device of claim 6, wherein a Physical Resource Block (PRB) index of the first frequency domain position of the second common PUCCH resource is: $RB_{BWP}^{offset}+\lfloor\gamma_{PUCCH}/N_{CS}\rfloor+RBoffset1$; and a PRB index of the second frequency domain position of the second common PUCCH resource is: $N_{BWP}^{size}-1-RB_{BWP}^{offset}-\lfloor\gamma_{PUCCH}/N_{CS}\rfloor-RBoffset2$, where $\gamma_{PUCCH}$ represents an index of the resource for sending the HARQ feedback information corresponding to the initial uplink BWP by the terminal device with RedCap, $N_{CS}$ represents a number of indexes in a set of initial cyclic shift (CS) indexes, $N_{BWP}^{size}$ represents a number of PRBs included in the initial uplink BWP, $RB_{BWP}^{offset}$ represents a PRB offset in configuration information of the first common PUCCH resource, RBoffset1 represents the first frequency offset and RBoffset2 represents the second frequency offset.

9. The terminal device of claim 6, wherein a PRB index of the first frequency domain position of the second common PUCCH resource is: $N_{BWP}^{size}-1-RB_{BWP}^{offset}-\lfloor(\gamma_{PUCCH}-8)/N_{CS}\rfloor-RBoffset2$; and a PRB index of the second frequency domain position of the second common PUCCH resource is: $RB_{BWP}^{offset}+\lfloor(\gamma_{PUCCH}-8)/N_{CS}\rfloor+RBoffset1$, where $\gamma_{PUCCH}$ represents an index of the resource for sending the HARQ feedback information corresponding to the initial uplink BWP by the terminal device with RedCap, $N_{CS}$ represents a number of indexes in a set of initial cyclic shift (CS) indexes, $N_{BWP}^{size}$ represents a number of PRBs included in the initial uplink BWP, $RB_{BWP}^{offset}$ represents a PRB offset in configuration information of the first common PUCCH resource, RBoffset1 represents the first frequency offset and RBoffset2 represents the second frequency offset.

10. The terminal device of claim 6, wherein the initial uplink BWP comprises the bandwidth for the terminal device with RedCap.

11. A network device, comprising:

at least one processor, configured to determine a second common Physical Uplink Control Channel (PUCCH) resource based on a frequency domain position of a first common PUCCH resource and a frequency offset, wherein the second common PUCCH resource is a resource, for sending Hybrid Automatic Repeat Request (HARQ) feedback information, within a bandwidth for a terminal device with reduced capability (RedCap), and the first common PUCCH resource is a resource, for sending HARQ feedback information, corresponding to an initial uplink bandwidth part (BWP), wherein the frequency offset comprises a first frequency offset and a second frequency offset, wherein a first frequency domain position of the second common PUCCH resource is obtained by adding the first frequency offset to a third frequency domain position of the first common PUCCH resource that is located in the initial uplink BWP;

a second frequency domain position of the second common PUCCH resource is obtained by subtracting the second frequency offset from a fourth frequency domain position of the first common PUCCH resource that is located in the initial uplink BWP; and a frequency at the third frequency domain position is less than a frequency at the fourth frequency domain position.

12. The network device of claim 11, further comprising:

at least one network interface, configured to send system information or a Radio Resource Control (RRC) signaling, wherein the system information or the RRC signaling carries the frequency offset.

13. The network device of claim 11, wherein a Physical Resource Block (PRB) index of the first frequency domain position of the second common PUCCH resource is: $RB_{BWP}^{offset}+\lfloor\gamma_{PUCCH}/N_{CS}\rfloor+RBoffset1$; and a PRB index of the second frequency domain position of the second common PUCCH resource is: $N_{BWP}^{size}-1-RB_{BWP}^{offset}-\lfloor\gamma_{PUCCH}/N_{CS}\rfloor-RBoffset2$, where $\gamma_{PUCCH}$ represents an index of the resource for sending the HARQ feedback information corresponding to the initial uplink BWP by the terminal device with RedCap, $N_{CS}$ represents a number of indexes in a set of initial cyclic shift (CS) indexes, $N_{BWP}^{size}$ represents a number of PRBs included in the initial uplink BWP, $RB_{BWP}^{offset}$ represents a PRB offset in configuration information of the first common PUCCH resource, RBoffset1 represents the first frequency offset and RBoffset2 represents the second frequency offset.

14. The terminal device of claim 11, wherein a PRB index of the first frequency domain position of the second common PUCCH resource is: $N_{BWP}^{size}-1-RB_{BWP}^{offset}-\lfloor(\gamma_{PUCCH}-8)/N_{CS}\rfloor-RBoffset2$; and a PRB index of the second frequency domain position of the second common PUCCH resource is: $RB_{BWP}^{offset}+\lfloor(\gamma_{PUCCH}-8)/N_{CS}\rfloor+RBoffset1$, where $\gamma_{PUCCH}$ represents an index of the resource for sending the HARQ feedback information corresponding to the initial uplink BWP by the terminal device with RedCap, $N_{CS}$ represents a number of indexes in a set of initial cyclic shift (CS) indexes, $N_{BWP}^{size}$ represents a number of PRBs included in the initial uplink BWP, $RB_{BWP}^{offset}$ represents a PRB offset in configuration information of the first common PUCCH resource, RBoffset1 represents the first frequency offset and RBoffset2 represents the second frequency offset.

* * * * *